US010999247B2

(12) United States Patent
Zong et al.

(10) Patent No.: US 10,999,247 B2
(45) Date of Patent: May 4, 2021

(54) DENSITY ESTIMATION NETWORK FOR UNSUPERVISED ANOMALY DETECTION

(71) Applicant: NEC Laboratories America, Inc., Princeton, NJ (US)

(72) Inventors: Bo Zong, Plainsboro, NJ (US); Daeki Cho, Highland Park, NJ (US); Cristian Lumezanu, Princeton Junction, NJ (US); Haifeng Chen, West Windsor, NJ (US); Qi Song, Pullman, WA (US)

(73) Assignee: NEC Corporation

( * ) Notice: Subject to any disclaimer, the term of this patent is extended or adjusted under 35 U.S.C. 154(b) by 268 days.

(21) Appl. No.: 16/169,012

(22) Filed: Oct. 24, 2018

(65) Prior Publication Data

US 2019/0124045 A1 Apr. 25, 2019

Related U.S. Application Data

(60) Provisional application No. 62/576,140, filed on Oct. 24, 2017.

(51) Int. Cl.
*H04L 29/06* (2006.01)
*G06N 3/08* (2006.01)
*G06N 3/04* (2006.01)

(52) U.S. Cl.
CPC .......... *H04L 63/0245* (2013.01); *G06N 3/04* (2013.01); *G06N 3/084* (2013.01); *G06N 3/088* (2013.01);
(Continued)

(58) Field of Classification Search
CPC .......... G06N 3/04; G06N 3/08; G06N 3/084; G06N 3/088; H04L 63/02; H04L 63/0227;
(Continued)

(56) References Cited

U.S. PATENT DOCUMENTS 9,319,421 B2 * 4/2016 Ferragut ............. H04L 63/1425
9,361,463 B2 * 6/2016 Ferragut ............... G06F 21/552
(Continued)

OTHER PUBLICATIONS

Yang et al., Towards K-means-friendly Spaces: Simultaneous Deep Learning and Clustering, 2017, Proceedings of the 34 th International Conference on Machine Learning, Sydney, Australia, PMLR 70, 2017 (Year: 2017).*

(Continued)

*Primary Examiner* — Khang Do
(74) *Attorney, Agent, or Firm* — Joseph Kolodka

(57) ABSTRACT

Systems and methods for preventing cyberattacks using a Density Estimation Network (DEN) for unsupervised anomaly detection, including constructing the DEN using acquired network traffic data by performing end-to-end training. The training includes generating low-dimensional vector representations of the network traffic data by performing dimensionality reduction of the network traffic data, predicting mixture membership distribution parameters for each of the low-dimensional representations by performing density estimation using a Gaussian Mixture Model (GMM) framework, and formulating an objective function to estimate an energy and determine a density level of the low-dimensional representations for anomaly detection, with an anomaly being identified when the energy exceeds a predefined threshold. Cyberattacks are prevented by blocking transmission of network flows with identified anomalies by directly filtering out the flows using a network traffic monitor.

18 Claims, 9 Drawing Sheets

(52) U.S. Cl.
CPC ........ *H04L 63/1425* (2013.01); *H04L 63/205* (2013.01)

(58) Field of Classification Search
CPC . H04L 63/0245; H04L 63/14; H04L 63/1408; H04L 63/142; H04L 63/1425; H04L 63/20
See application file for complete search history.

(56) References Cited

U.S. PATENT DOCUMENTS

| | | | | |
|---|---|---|---|---|
| 9,843,596 | B1* | 12/2017 | Averbuch | H04L 63/1416 |
| 9,942,254 | B1* | 4/2018 | Averbuch | H04L 63/1425 |
| 10,148,680 | B1* | 12/2018 | Segev | H04L 63/1425 |
| 10,692,004 | B1* | 6/2020 | Segev | G06F 11/0751 |
| 2008/0271143 | A1* | 10/2008 | Stephens | H04L 63/1425 726/22 |
| 2013/0289904 | A1* | 10/2013 | Marwah | G01D 4/00 702/61 |
| 2015/0058982 | A1* | 2/2015 | Eskin | H04L 63/1425 726/23 |
| 2015/0161394 | A1* | 6/2015 | Ferragut | H04L 63/1425 726/25 |
| 2016/0253598 | A1* | 9/2016 | Yamada | G06N 20/10 706/12 |
| 2016/0253672 | A1* | 9/2016 | Hunter | G06Q 20/4016 705/39 |
| 2016/0359695 | A1* | 12/2016 | Yadav | G06N 20/00 |
| 2016/0359740 | A1* | 12/2016 | Parandehgheibi | G06F 16/24578 |
| 2016/0359886 | A1* | 12/2016 | Yadav | H04L 63/1425 |
| 2017/0061322 | A1* | 3/2017 | Chari | H04L 63/1425 |
| 2017/0147941 | A1* | 5/2017 | Bauer | G06N 7/005 |
| 2018/0082150 | A1* | 3/2018 | Itou | G06K 9/6248 |
| 2019/0188212 | A1* | 6/2019 | Miller | G06N 20/00 |

OTHER PUBLICATIONS

Chen et al., "One-Class SVM for Learning in Image Retrieval", IEEE 2001, Nov. 2011, pp. 34-37.
Vincent et al., "Stacked Denoising Autoencoders: Learning Useful Representations in a Deep Network with a Local Denoising Criterion", Journal of Machine Learning Research 11 (2010), Dec. 2010, pp. 3371-3408.
Yang et al., "Towards K-means-friendly Spaces: Simultaneous Deep Learning and Clustering", arXiv:1610.04794v2 [cs.LG] Jun. 13, 2017, 14 pages.
Zhai et al., "Deep Structured Energy Based Models for Anomaly Detection", enarXiv:1605.07717v2 [cs.LG] Jun. 16, 2016, 10 pages.
Zong et al., "Deep Autoencoding Gaussian Mixture Model for Unsupervised Anomaly Detection", ICLR 2018, Feb. 2018, pp. 1-19.

* cited by examiner

DENSITY ESTIMATION NETWORK FOR UNSUPERVISED ANOMALY DETECTION

RELATED APPLICATION INFORMATION

This application claims priority to U.S. Provisional Patent Application 62/576,140, filed on Oct. 24, 2017, incorporated herein by reference in its entirety.

BACKGROUND

Technical Field

The present invention relates to anomaly/outlier detection, and more particularly to constructing and utilizing a Density Estimation Network for unsupervised anomaly/outlier detection over high-dimensional and contaminated data.

Description of the Related Art

Anomaly/outlier detection is one of the fundamental problems in data mining and machine learning, with critical applications in the areas, such as cybersecurity, complex system management, medical care, bioinformatics, and so on. Given a set of data samples, anomalies/outliers are those samples that are significantly different from others under the metric defined in an anomaly detector. In practice, conventional anomaly detection techniques cannot achieve satisfactory performance in many tasks, as data from real-life applications often violates the assumptions required to be made when utilizing such conventional techniques. For example, many conventional techniques assume that input data has a low number of dimensions. However, real-life data often does not stay in the low-dimensional regime. Rather, this can involve tens, hundreds, thousands, etc. of dimensions, thus causing conventional techniques to suffer from the well-known problem of dimensionality. Furthermore, input data may not be clean, but include true outliers or anomalies, which causes conventional techniques that assume clean data to be difficult to work (e.g., resource requirement prohibitive), and suffer from poor anomaly/outlier detection performance.

SUMMARY

According to an aspect of the present invention, a method is provided for preventing cyberattacks using a Density Estimation Network (DEN) for unsupervised anomaly detection, including constructing the DEN using acquired network traffic data by performing end-to-end training. The training includes generating low-dimensional vector representations of the network traffic data by performing dimensionality reduction of the network traffic data, predicting mixture membership distribution parameters for each of the low-dimensional representations by performing density estimation using a Gaussian Mixture Model (GMM) framework, and formulating an objective function to estimate an energy and determine a density level of the low-dimensional representations for anomaly detection, with an anomaly being identified when the energy exceeds a pre-defined threshold. Cyberattacks are prevented by blocking transmission of network flows with identified anomalies by directly filtering out the flows using a network traffic monitor.

According to another aspect of the present invention, a system is provided for preventing cyberattacks using a DEN for unsupervised anomaly detection. A DEN constructor constructs the DEN using acquired network traffic data by performing end-to-end training. The training includes generating low-dimensional vector representations of the network traffic data by performing dimensionality reduction of the network traffic data using a compression network, predicting, using a density estimator, mixture membership distribution parameters for each of the low-dimensional representations by performing density estimation using a GMM framework, and formulating an objective function to estimate an energy and determine a density level of the low-dimensional representations for anomaly detection using an objective function calculator, with an anomaly being identified when the energy exceeds a pre-defined threshold. Cyberattacks are prevented by blocking transmission of network flows with identified anomalies by directly filtering out the flows using a network traffic monitor.

According to another aspect of the present invention, a non-transitory computer readable storage medium including a computer readable program for preventing cyberattacks using a DEN for unsupervised anomaly detection, wherein the computer readable program when executed on a computer causes the computer to construct the DEN using acquired network traffic data by performing end-to-end training. The training includes generating low-dimensional vector representations of the network traffic data by performing dimensionality reduction of the network traffic data, predicting mixture membership distribution parameters for each of the low-dimensional representations by performing density estimation using a GMM framework, and formulating an objective function to estimate an energy and determine a density level of the low-dimensional representations for anomaly detection, with an anomaly being identified when the energy exceeds a pre-defined threshold. Cyberattacks are prevented by blocking transmission of network flows with identified anomalies by directly filtering out the flows using a network traffic monitor.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
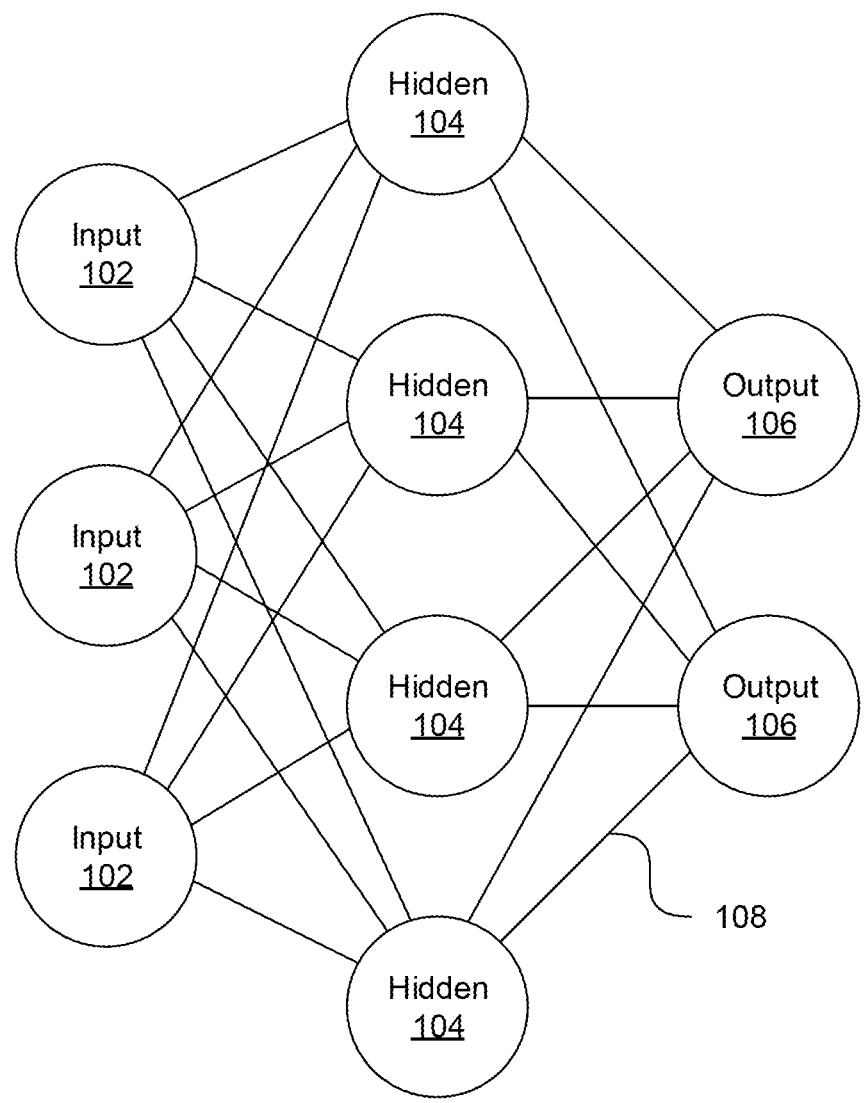
FIG. 1 is a high-level generalized diagram illustrating an exemplary neural network, in accordance with the present invention.

In accordance with the present invention, systems and methods are provided for constructing and utilizing a Density Estimation Network (DEN) for anomaly detection in complex physical systems.

In various embodiments, a DEN can be utilized for prevention of cyberattacks by performing anomaly/outlier detection, and/or automatic corrective actions (e.g., quarantine, shut down particular systems/networks, etc.) in accordance with the present invention. For example, consider the following real-life scenario from a cybersecurity standpoint. It is known that spoofing attacks are a major threat to cybersecurity. As the way to perform spoofing attacks evolves quickly (e.g. zero-day attack), it is difficult and/or impossible to extract signatures from such attacks using conventional techniques. Moreover, even if signatures are learned, it is still difficult, and processor resource power prohibitive, to accurately and efficiently capture any attacks as attack behaviors already evolve using conventional systems and methods. In sum, signature-based or supervised methods are not suitable for such applications.

In various embodiments, unsupervised anomaly/outlier detection can be efficiently and accurately performed, and regardless of whether and/or how spoofing attacks evolve, their behaviors can still be detected as different from normal behaviors in any of a plurality of aspects, and cyberattacks can be prevented, in accordance with the present invention. Such unsupervised anomaly detection is a more practical, and less resource intensive solution than any conventional systems and methods. In some embodiments, the present invention can include training and/or testing phases to apply anomaly detection for the task of spoofing attack detection.

For example, in the training phase, a set of network traffic data can be acquired/detected/received, and employed as input to train a detector device. In this phase, the present invention can extract features and build vector representation for such data by domain knowledge, and then can utilize machine learning and statistical methods to learn and construct a detector that best evaluates the similarities among training data. In the testing phase, the present invention can deal with incoming traffic data. In this phase, the present invention can repeat the same method used in the training phase to convert traffic data into their vector representation. The similarity of the converted data can be evaluated by the learned detector, and then anomalous data points can be identified as those that are statistically significantly different from others, which can further reported and/or isolated as potential spoofing attack traffics in accordance with various embodiments of the present invention, which will be described in further detail hereinbelow.

In various embodiments, an artificial neural network (ANN) can be employed for prevention of cyberattacks (e.g., spoofing attacks, zero-day attacks, etc.) in accordance with the present invention. An ANN is an information processing system that is inspired by biological nervous systems, such as the brain. The key element of ANNs is the structure of the information processing system, which includes a large number of highly interconnected processing elements (called "neurons") working in parallel to solve specific problems. ANNs are furthermore trained in-use, with learning that involves adjustments to weights that exist between the neurons. An ANN is configured for a specific application, such as pattern recognition or data classification, through such a learning process.

Unsupervised anomaly detection on multi- or high-dimensional data is of great importance in both fundamental machine learning research and industrial applications, for which density estimation lies at the core. Although previous approaches based on dimensionality reduction followed by density estimation have made fruitful progress, they mainly suffer from decoupled model learning with inconsistent optimization goals and incapability of preserving essential information in the low-dimensional space. In various embodiments of the present invention, a Density Estimation Network (DEN)-based Deep Autoencoding Gaussian Mixture Model (DAGMM) can be constructed and utilized for unsupervised anomaly detection. Our model can utilize a deep autoencoder to generate a low-dimensional representation and reconstruction error for each input data point, which can be further fed into a Gaussian Mixture Model (GMM).

In some embodiments, instead of using decoupled two-stage training and the standard Expectation-Maximization (EM) algorithm, as in conventional methods, the present invention can jointly optimize the parameters of the deep autoencoder and the mixture model simultaneously in an end-to-end fashion, leveraging a separate estimation network to facilitate the parameter learning of the mixture model. The joint optimization, which well balances autoencoding reconstruction, density estimation of latent representation, and regularization, helps the autoencoder escape from less attractive local optima and further reduce reconstruction errors, thus eliminating avoiding the need of pre-training.

Unsupervised anomaly detection is a well-known, fundamental problem in machine learning, with critical applications in many industries (e.g., cybersecurity, complex system management, medical care, etc.). In various embodiments of the present invention, an important feature for anomaly detection is density estimation (e.g., given a lot of input samples, anomalies are those ones residing in low probability density areas). Although some progress has been made in the last several years, conducting robust anomaly detection on multi- or high-dimensional data accurately and within computing system resource capabilities without human supervision cannot be executed effectively using conventional systems and methods. Especially, when the dimensionality of input data becomes higher, it is even more difficult to perform density estimation in the original feature space, as any input sample could be a rare event with low probability to observe.

To address this issue caused by the curse of dimensionality, two-step approaches have been widely adopted, in which dimensionality reduction is first conducted, and then density estimation is performed in the latent low-dimensional space. However, these approaches lead to suboptimal performance, because dimensionality reduction in the first step is unaware of the subsequent density estimation task, and some key information for anomaly detection could be removed in the first place, resulting in poor detection and/or inaccurate anomaly/outlier reporting, and thus providing suboptimal cybersecurity protections. To overcome these problems, in various embodiments of the present invention, the force of dimensionality reduction and density estimation can be combined, although a joint optimization accounting for these two components can be computationally difficult.

In various embodiments, key information of an input sample can be preserved in a low-dimensional space that includes features from both the reduced dimensions discovered by dimensionality reduction and the induced reconstruction error in accordance with the present invention. Anomalies/outliers can differ from normal samples in various aspects, including, for example: (1) anomalies can be significantly deviated in the reduced dimensions where their features are correlated in a different way; and (2) anomalies are harder to reconstruct, compared with normal samples. Unlike conventional methods that only involve one of the aspects, and provide sub-optimal performance, the present invention can utilize a sub-network (e.g., compression network) to perform dimensionality reduction by an autoencoder, which can prepare a low-dimensional representation for an input sample by concatenating reduced low-dimensional features from encoding and the reconstruction error from decoding in accordance with various embodiments.

The present invention can leverage a Gaussian Mixture Model (GMM) over the learned low-dimensional space to deal with density estimation tasks for input data with complex structures, which are challenging and/or computation cost prohibitive for conventional systems/methods using simple models. While GMM has strong capability, it also introduces new challenges in model learning. For example, as GMM is usually learned by alternating algorithms such as Expectation-Maximization (EM), it is difficult to perform joint optimization of dimensionality reduction and density estimation favoring GMM learning, which is often degenerated into a conventional two-step approach.

In some embodiments, to address this training challenge, the present invention utilizes a sub-network (e.g., estimation network) that can take the low-dimensional input from the compression network and output a mixture membership prediction for each sample. With the predicted sample membership, the parameters of GMM can be directly estimated, facilitating the evaluation of the energy/likelihood of input samples in accordance with the present invention. By simultaneously minimizing reconstruction error from compression network and sample energy from estimation network, a dimensionality reduction component that directly helps the targeted density estimation task can be jointly trained in accordance with the present invention.

In some embodiments, the present invention can include friendly to end-to-end training. Using conventional systems/methods, it is difficult to learn deep autoencoders by end-to-end training, as they can be easily stuck in less attractive local optima, and thus, pre-training is widely adopted in practice. However, pre-training limits the potential to adjust the dimensionality reduction behavior at least because it is difficult to make any significant change to a well-trained autoencoder via fine-tuning. Experimental results have shown that the DEN-based DAGMM of the present invention is well-learned by the end-to-end training, as the regularization introduced by the estimation network greatly helps the autoencoder in the compression network escape from less attractive local optima in accordance with various embodiments.

Experimental results on several public benchmark datasets show that the present invention significantly outperforms conventional state-of-the-art anomaly detection techniques, and achieves up to 14% improvement based on the standard $F_1$ score for anomaly detection, which will be described in further detail herein below. Moreover, we observe that the reconstruction error from the autoencoder in DEN-based DAGMM by the end-to-end training is as low as the one made by its pre-trained counterpart, while the reconstruction error from an autoencoder without the regularization from the estimation network stays comparatively high. In addition, the end-to-end trained DEN-based DAGMM significantly outperforms all the baseline methods that rely on pre-trained autoencoders.

In recent years, tremendous effort has been devoted to unsupervised anomaly detection, and the existing methods can be grouped into three categories, namely reconstruction-based, clustering analysis, and one-class classification approaches. However, all of these existing approaches suffer from drawbacks, which are described in further detail herein below.

Reconstruction based methods assume that anomalies are incompressible and thus cannot be effectively reconstructed from low-dimensional projections. Conventional methods in this category include Principal Component Analysis (PCA) with explicit linear projections, kernel PCA with implicit non-linear projections induced by specific kernels, and Robust PCA (RPCA) that makes PCA less sensitive to noise by enforcing sparse structures. In addition, multiple recent works propose to analyze the reconstruction error induced by deep autoencoders, and demonstrate promising results.

However, the performance of reconstruction-based methods is limited by the fact that they only conduct anomaly analysis from a single aspect, that is, reconstruction error. Although the compression on anomalous samples could be different from the compression on normal samples and some of them do demonstrate unusually high reconstruction errors, a significant amount of anomalous samples could also lurk with a normal level of error, which usually happens when the underlying dimensionality reduction methods have high model complexity or the samples of interest are noisy with complex structures. Even in these cases, we still have the hope to detect such "lurking" anomalies, as they still reside in low-density areas in the reduced low-dimensional space. Unlike the existing reconstruction-based methods, the present invention considers both aspects essentially simultaneously, and performs density estimation in a low-dimensional space derived from the reduced representation and the reconstruction error caused by the dimensionality reduction, for a comprehensive view in accordance with various embodiments.

Clustering analysis is another popular category of methods used for density estimation and anomaly detection (e.g., multivariate Gaussian Models, Gaussian Mixture Models, k-means, etc.). Because of the curse of dimensionality, it is difficult and/or impossible to directly apply such methods to multi- or high-dimensional data. Traditional techniques adopt a two-step approach, where dimensionality reduction is conducted first, then clustering analysis is performed, and the two steps are separately learned. One of the drawbacks in the two-step approach is that dimensionality reduction is trained without the guidance from the subsequent clustering analysis, thus the key information for clustering analysis could be lost during dimensionality reduction. To address this issue, recent works propose deep autoencoder based methods in order to jointly learn dimensionality reduction and clustering components.

However, the performance of these conventional state-of-the-art methods is limited by over-simplified clustering models that are unable to handle clustering or density estimation tasks for data of complex structures, or the pre-trained dimensionality reduction component (e.g., autoencoder) has little potential to accommodate further adjustment by the subsequent fine-tuning for anomaly detection. In some embodiments, the present invention can explicitly address and resolve these issues by a sub-network (e.g., estimation network) that evaluates sample density in the low-dimensional space produced by its compression network. By predicting sample mixture membership, the parameters of GMM can be estimated accurately and efficiently without EM-like alternating procedures. Moreover, the present invention is friendly to end-to-end training to realize the full potential of adjusting dimensionality reduction components and jointly improve the quality of clustering analysis/density estimation in accordance with various embodiments of the present invention.

In addition, one-class classification approaches are also widely used for anomaly detection. Under this framework, a discriminative boundary surrounding the normal instances is learned by algorithms (e.g., one-class SVM). When the number of dimensions grows higher, such techniques suffer from suboptimal performance due to the curse of dimensionality. Unlike these methods, the present invention can estimate data density in a jointly learned low-dimensional space for more robust anomaly detection than conventional systems and methods.

In accordance with various embodiments, the present invention can focus on unsupervised settings. For example, useful features for anomaly detection can be extracted through non-linear dimensionality reduction realized by a deep autoencoder, and their density can be jointly learned under the GMM framework by mixture membership estimation, in combination with a deep autoencoder. Further, the present invention can combine induced reconstruction error and learned latent representation for unsupervised anomaly detection.

In various embodiments, unsupervised anomaly detection for real-life data that involves high dimensionality and is potentially contaminated with anomalies in training data can be performed in accordance with the present invention. There are two main challenges for such unsupervised anomaly detection: (1) high dimensionality, and (2) contaminated training data.

For high dimensionality, existing works mainly adopt a two-step approach. At step 1, one utilizes dimension reduction techniques, such as an autoencoder, to reduce the number of dimensions. At step 2, one applies off-the-shelf anomaly detection techniques for low-dimensional data to build detectors. One problem with this type of technique is that the dimension reduction techniques at step 1 are unware of the anomaly detection tasks at step 2 so that the key information for step 2 could be lost because of step 1, thus resulting in inferior performance. Some conventional methods jointly consider step 1 and step 2 by deep learning methods, but they can only use reduced dimensions to evaluate similarity or adopt techniques that are unable to capture complex structure among training data at step 2, which significantly limits their detection performance. In addition, existing techniques can only function effectively if it is assumed that training data is clean, and provide suboptimal performance in the presence of contaminated training data. For contaminated training data, one-class support vector machines (OC-SVM) have been employed to address this challenge, but the performance of OC-SVM significantly drops when dimensionality in data gets high.

In various embodiments, the present invention can construct and/or utilize a deep learning method, referred to as a Density Estimation Network (DEN) that jointly learns dimension reduction and density estimation function for anomaly detection. In some embodiments, DEN includes two major components: (1) dimension reduction network, and (2) density estimation network. In the dimension reduction network, the present invention can employ an autoencoder as the network architecture. In density estimation network, the present invention can perform Gaussian mixture modeling, and directly predict the membership distribution for each sample. Using the predicted membership distribution, the present invention can directly evaluate whether a sample lies in a high or low-density area under Gaussian mixture modeling, and determine the presence of anomalies/outliers in accordance with various embodiments. In various embodiments, when DEN is trained, we can utilize equation 6 (described herein below) to evaluate the energy of a sample, and a sample with lower $E(z)$ means this sample is in a higher density area in accordance with the present invention.

In some embodiments, the present invention can include two phases: training and testing. In the training phase, given training data, the DEN of the present invention can automatically adjust parameters by optimizing the model objective function. In the testing phase, given a testing sample, the learned DEN can estimate whether this sample resides in high or low-density areas for anomaly detection. For example, for samples that reside in low density areas, they can be significantly different from others, and can be reported as anomalies/outliers and/or corrective actions can be performed for improved cybersecurity for any of a plurality of systems/facilities in accordance with the present invention.

The present invention provides a principled method that solves the unsupervised anomaly detection problem for high dimensional data with contaminated training data. The present invention can significantly improve the detection accuracy/performance in many applications, such as attack detection in cybersecurity, system failure detection in complex system management, disease detection in medical care, etc. in accordance with various embodiments.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now in detail to the figures in which like numerals represent the same or similar elements and initially to FIG. 1, a high-level generalized diagram showing exemplary neural network 100 is illustratively depicted in accordance with one embodiment of the present invention. Neural networks demonstrate an ability to derive meaning from complicated or imprecise data and can be used to extract patterns and detect trends that are too complex to be detected by humans or other computer-based systems.

In one embodiment, the structure of a neural network can include input neurons 102 that provide information to one or more "hidden" neurons 104. Connections 108 between the input neurons 102 and hidden neurons 104 are weighted and these weighted inputs are then processed by the hidden neurons 104 according to some function in the hidden neurons 104, with weighted connections 108 between the layers. There may be any number of layers of hidden neurons 104, and as well as neurons that perform different functions. There exist different neural network structures as well, such as convolutional neural network, maxout network, artificial neural network, etc. Finally, a set of output neurons 106 accepts and processes weighted input from the last set of hidden neurons 104.

In one embodiment, this represents a "feed-forward" computation, where information propagates from input neurons 102 to the output neurons 106. Upon completion of a feed-forward computation, the output is compared to a desired output available from training data. The error relative to the training data is then processed in "feed-back" computation, where the hidden neurons 104 and input neurons 102 receive information regarding the error propagating backward from the output neurons 106. Once the backward error propagation has been completed, weight updates are performed, with the weighted connections 108 being updated to account for the received error. This represents just one variety of neural network, and it is to be appreciated that any type of neural network may be utilized in accordance with various embodiments of the present invention.

Figure 2:
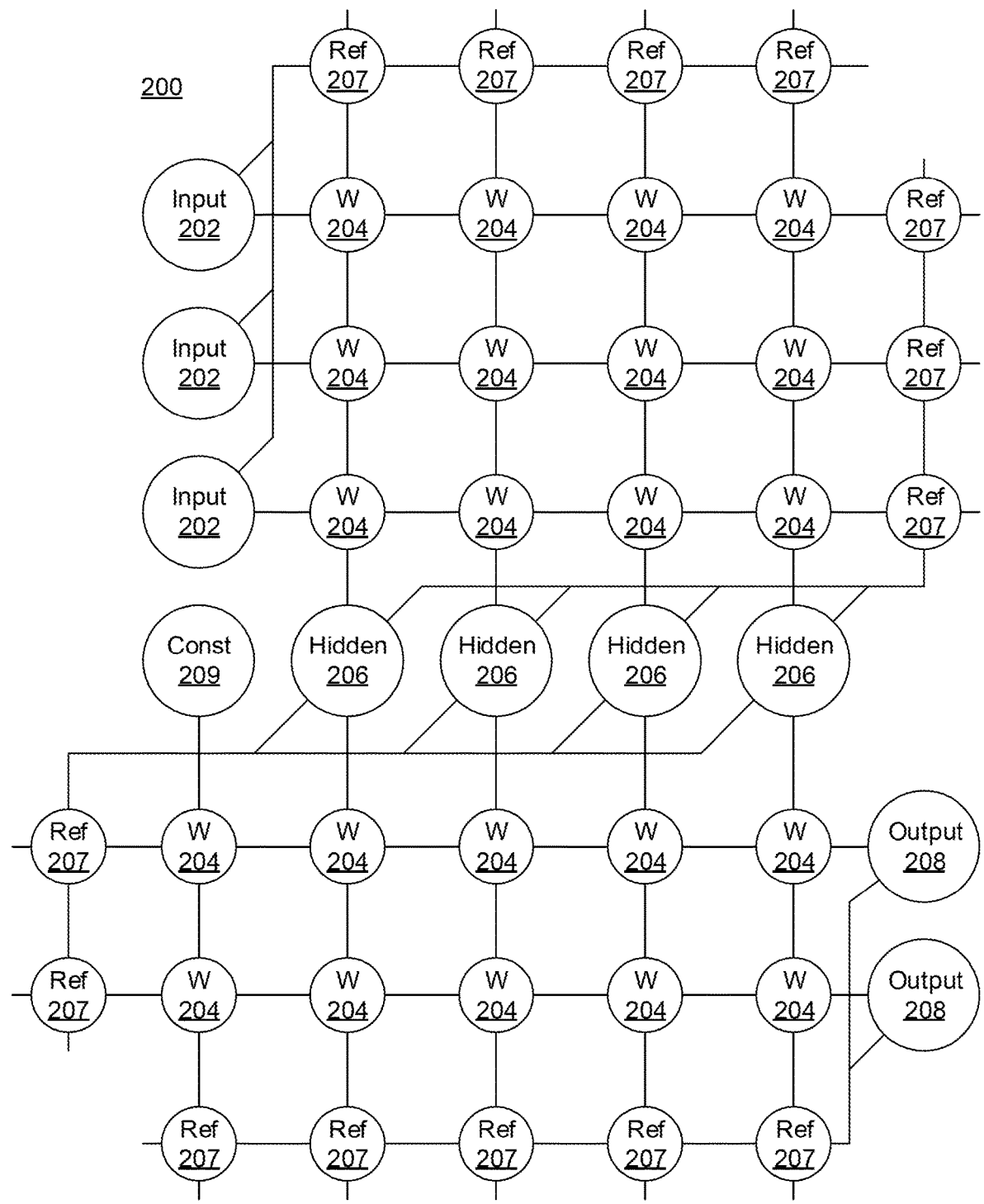
FIG. 2 is a block/flow diagram illustrating an exemplary artificial neural network (ANN) architecture, in accordance with the present invention.

Referring now to FIG. 2, a block/flow diagram showing an exemplary artificial neural network (ANN) architecture 200 is illustratively depicted in accordance with an embodiment of the present invention. It should be understood that the present architecture is purely exemplary, and that other architectures or types of neural network may be used instead in accordance with various embodiments of the present invention.

In one embodiment, during feed-forward operation, a set of input neurons 202 each provide an input voltage in parallel to a respective row of weights 204. The weights 204 each have a settable resistance value, such that a current output flows from the weight 204 to a respective hidden neuron 206 to represent the weighted input. The current output by a given weight is determined as $$I = \frac{V}{r},$$

where V is the input voltage from the input neuron 202 and r is the set resistance of the weight 204. The current from each weight adds column-wise and flows to a hidden neuron 206. A set of reference weights 207 have a fixed resistance and combine their outputs into a reference current that is provided to each of the hidden neurons 206. Because conductance values can only be positive numbers, some reference conductance is needed to encode both positive and negative values in the matrix. The currents produced by the weights 204 are continuously valued and positive, and therefore the reference weights 207 are used to provide a reference current, above which currents are considered to have positive values and below which currents are considered to have negative values.

As an alternative to using the reference weights 207, another embodiment may use separate arrays of weights 204 to capture negative values. Each approach has advantages and disadvantages. Using the reference weights 207 is more efficient in chip area, but reference values need to be matched closely to one another. In contrast, the use of a separate array for negative values does not involve close matching as each value has a pair of weights to compare against. However, the negative weight matrix approach uses roughly twice the chip area as compared to the single reference weight column. In addition, the reference weight column generates a current that needs to be copied to each neuron for comparison, whereas a negative matrix array provides a reference value directly for each neuron. In the negative array embodiment, the weights 204 of both positive and negative arrays are updated, but this also increases signal-to-noise ratio as each weight value is a difference of two conductance values. The two embodiments provide identical functionality in encoding a negative value and those having ordinary skill in the art will be able to choose a suitable embodiment for the application at hand.

The hidden neurons 206 use the currents from the array of weights 204 and the reference weights 207 to perform some calculation. The hidden neurons 206 then output a voltage of their own to another array of weights 204. This array performs in the same way, with a column of weights 204 receiving a voltage from their respective hidden neuron 206 to produce a weighted current output that adds row-wise and is provided to the output neuron 208.

It should be understood that any number of these stages may be implemented, by interposing additional layers of arrays and hidden neurons 206. It should also be noted that some neurons may be constant neurons 209, which provide a constant voltage to the array. The constant neurons 209 can be present among the input neurons 202 and/or hidden neurons 206 and are only used during feed-forward operation.

During back propagation, the output neurons 208 provide a voltage back across the array of weights 204. The output layer compares the generated network response to training data and computes an error. The error is applied to the array as a voltage pulse, where the height and/or duration of the pulse is modulated proportional to the error value. In this example, a row of weights 204 receives a voltage from a respective output neuron 208 in parallel and converts that voltage into a current which adds column-wise to provide an input to hidden neurons 206. The hidden neurons 206 combine the weighted feedback signal with a derivative of its feed-forward calculation and stores an error value before outputting a feedback signal voltage to its respective column of weights 204. This back propagation travels through the entire network 200 until all hidden neurons 206 and the input neurons 202 have stored an error value.

During weight updates, the input neurons 202 and hidden neurons 206 apply a first weight update voltage forward and the output neurons 208 and hidden neurons 206 apply a second weight update voltage backward through the network 200. The combinations of these voltages create a state change within each weight 204, causing the weight 204 to take on a new resistance value. In this manner the weights 204 can be trained to adapt the neural network 200 to errors in its processing. It should be noted that the three modes of operation, feed forward, back propagation, and weight update, do not overlap with one another.

Figure 3:
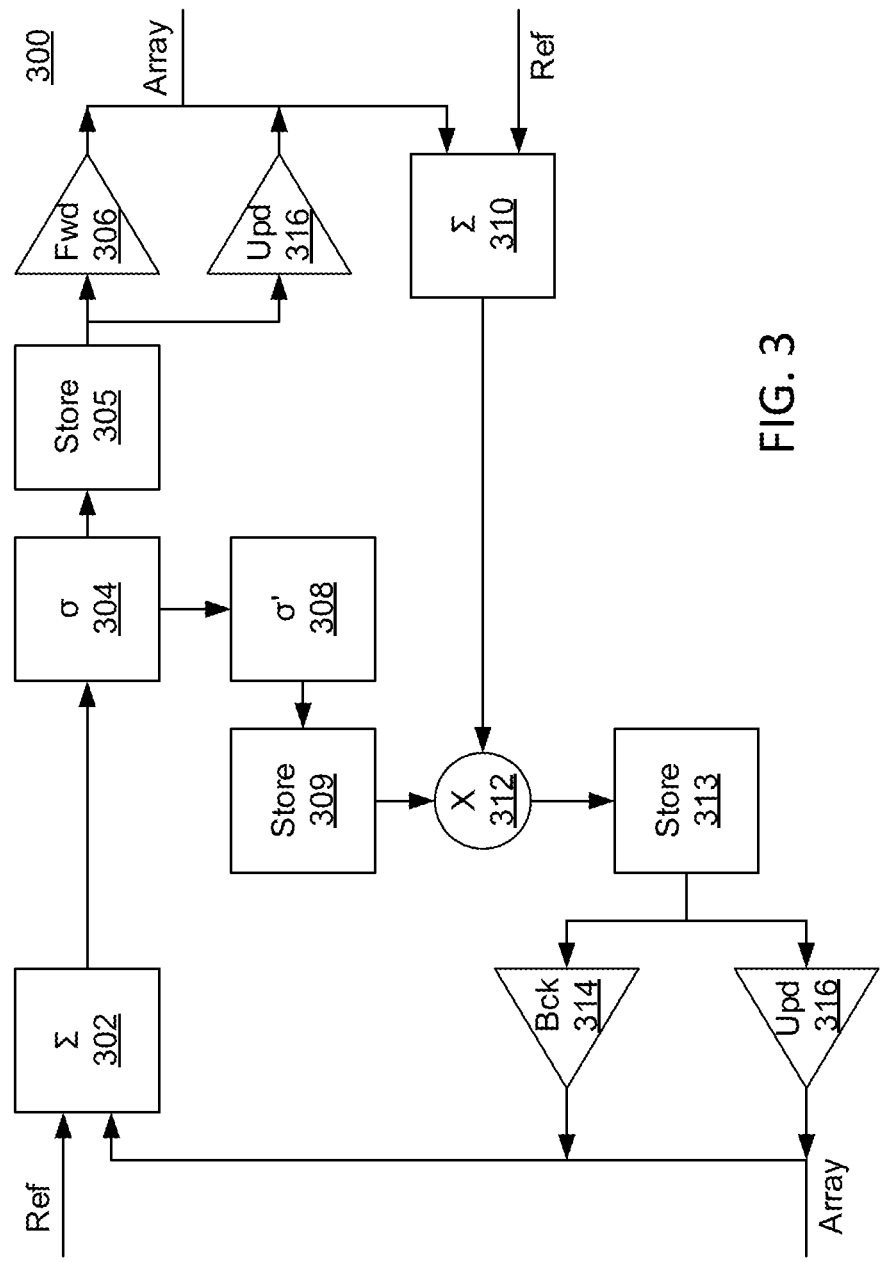
FIG. 3 is a block/flow diagram illustrating an exemplary neuron in a neural network, in accordance with the present invention.

Referring now to FIG. 3, with continued reference to FIG. 2, a block/flow diagram showing a neuron 300 in a neural network is illustratively depicted in accordance with an embodiment of the present invention. In accordance with various embodiments, this neuron may represent any of the input neurons 202, the hidden neurons 206, or the output neurons 208, as described above with reference to FIG. 2. It should be noted that FIG. 3 shows components to address all three phases of operation: feed forward, back propagation, and weight update. However, because the different phases do not overlap, there will necessarily be some form of control mechanism within in the neuron 300 to control which components are active. It should therefore be understood that there may be switches and other structures that are not shown in the neuron 300 to handle switching between modes.

In one embodiment, in feed forward mode, a difference block 302 determines the value of the input from the array by comparing it to the reference input. This sets both a magnitude and a sign (e.g., + or −) of the input to the neuron 300 from the array. Block 304 performs a computation based on the input, the output of which is stored in storage 305. It is specifically contemplated that block 304 computes a non-linear function and may be implemented as analog or digital circuitry or may be performed in software. The value determined by the function block 304 is converted to a voltage at feed forward generator 306, which applies the voltage to the next array. The signal propagates this way by passing through multiple layers of arrays and neurons until it reaches the final output layer of neurons. The input is also applied to a derivative of the non-linear function in block 308, the output of which is stored in memory 309.

During back propagation mode, an error signal is generated. The error signal may be generated at an output neuron 208 or may be computed by a separate unit that accepts inputs from the output neurons 208 and compares the output to a correct output based on the training data. Otherwise, if the neuron 300 is a hidden neuron 206, it receives back propagating information from the array of weights 204 and compares the received information with the reference signal at difference block 310 to provide a continuously valued, signed error signal. This error signal is multiplied by the derivative of the non-linear function from the previous feed forward step stored in memory 309 using a multiplier 312, with the result being stored in the storage 313. The value determined by the multiplier 312 is converted to a backwards propagating voltage pulse proportional to the computed error at back propagation generator 314, which applies the voltage to the previous array. The error signal propagates in this way by passing through multiple layers of arrays and neurons until it reaches the input layer of neurons 202.

In one embodiment, during weight update mode, after both forward and backward passes are completed, each weight 204 is updated proportional to the product of the signal passed through the weight during the forward and backward passes. The update signal generators 316 provide voltage pulses in both directions (though note that, for input and output neurons, only one direction will be available). The shapes and amplitudes of the pulses from update generators 316 are configured to change a state of the weights 204, such that the resistance of the weights 204 is updated.

In various embodiments, the weights 204 may be implemented in software or in hardware, for example using relatively complicated weighting circuitry or using resistive cross point devices in accordance with the present invention. Such resistive devices may have switching characteristics that have a non-linearity that can be used for processing data. The weights 204 may belong to a class of device called a resistive processing unit (RPU), because their non-linear characteristics are used to perform calculations in the neural network 200. The RPU devices may be implemented with resistive random access memory (RRAM), phase change memory (PCM), programmable metallization cell (PMC) memory, or any other device that has non-linear resistive switching characteristics. Such RPU devices may also be considered as memristive systems.

Figure 4:
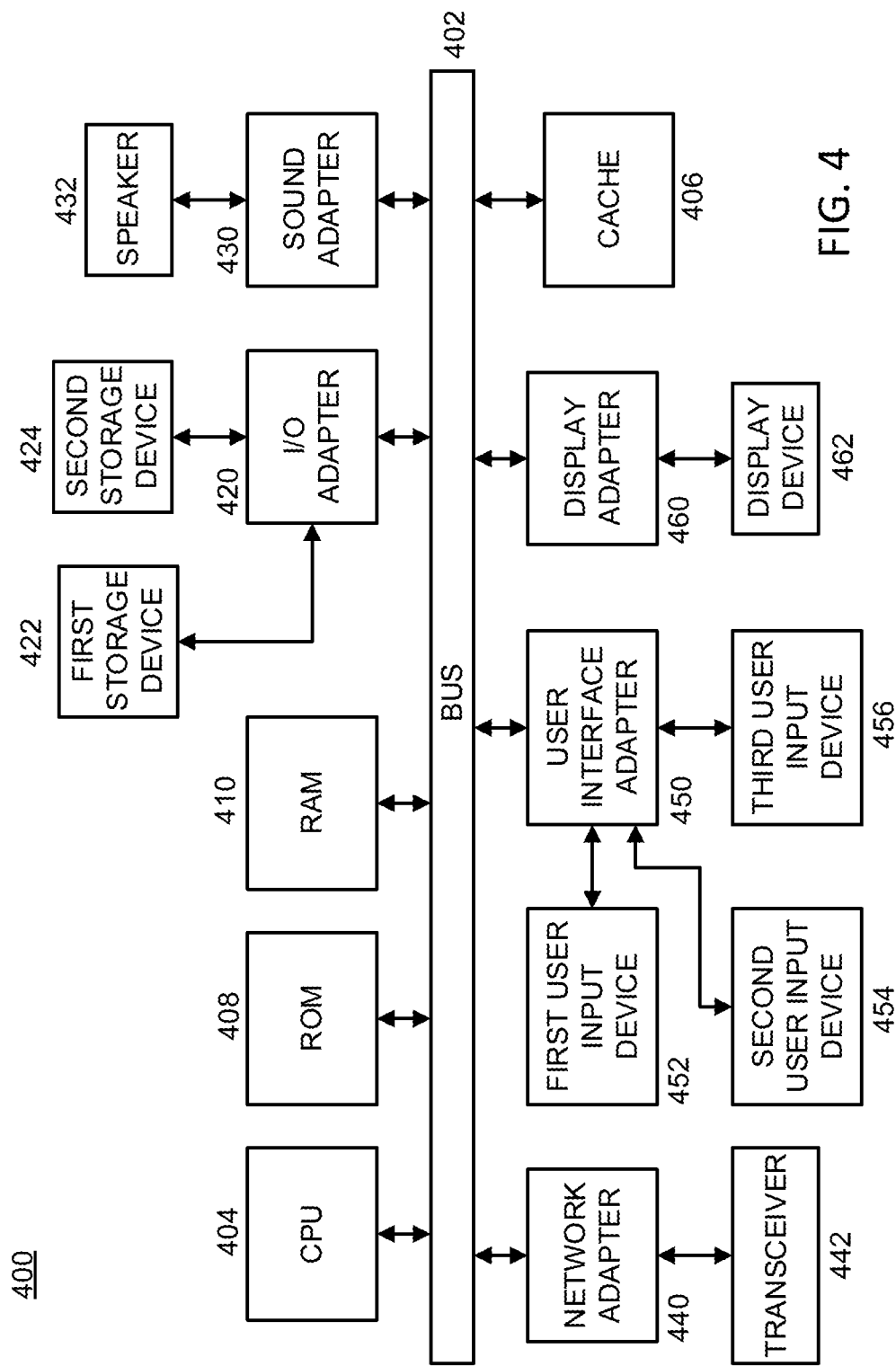
FIG. 4 is a high-level block diagram illustrating an exemplary processing system to which the present principles may be applied, in accordance the present invention.

Referring now to FIG. 4, a high-level block diagram showing an exemplary processing system 400 to which the present principles may be applied is illustratively depicted in accordance with an embodiment of the present invention.

The processing system 400 includes at least one processor (CPU) 404 operatively coupled to other components via a system bus 402. A cache 406, a Read Only Memory (ROM) 408, a Random Access Memory (RAM) 410, an input/output (I/O) adapter 420, a sound adapter 430, a network adapter 440, a user interface adapter 450, and a display adapter 460, are operatively coupled to the system bus 402.

A first storage device 422 and a second storage device 424 are operatively coupled to system bus 402 by the I/O adapter 420. The storage devices 422 and 424 can be any of a disk storage device (e.g., a magnetic or optical disk storage device), a solid state magnetic device, and so forth. The storage devices 422 and 424 can be the same type of storage device or different types of storage devices.

A speaker 432 is operatively coupled to system bus 402 by the sound adapter 430. A transceiver 442 is operatively coupled to system bus 402 by network adapter 440. A display device 462 is operatively coupled to system bus 402 by display adapter 460.

A first user input device 452, a second user input device 454, and a third user input device 456 are operatively coupled to system bus 402 by user interface adapter 450. The user input devices 452, 454, and 456 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 452, 454, and 456 can be the same type of user input device or different types of user input devices. The user input devices 452, 454, and 456 are used to input and output information to and from system 400.

Of course, the processing system 400 may also include other elements (not shown), as readily contemplated by one of skill in the art, as well as omit certain elements. For example, various other input devices and/or output devices can be included in processing system 400, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 400 are readily contemplated by one of ordinary skill in the art given the teachings of the present principles provided herein.

Moreover, it is to be appreciated that systems 100, 200, 300, 400, 500, 700, 800, and 900, described herein with respect to FIGS. 1, 2, 3, 4, 5, 7, 8, and 9, are systems for implementing, individually or collectively, respective embodiments of the present invention. For example, part or all of processing system 400 may be implemented in one or more of the elements of systems 100, 200, 300, 500, 700, 800, and 900, respectively, in accordance with various embodiments of the present invention.

Further, it is to be appreciated that processing system 400 may perform at least part of the methods described herein including, for example, at least part of methods 500, 600, 700, and 900, described herein with respect to FIGS. 5, 6, 7, and 9. Similarly, part or all of system 800 can be used to perform at least part of methods 500, 600, 700, and 900 of FIGS. 5, 6, 7, and 9, respectively, in accordance with various embodiments of the present invention.

Figure 5:
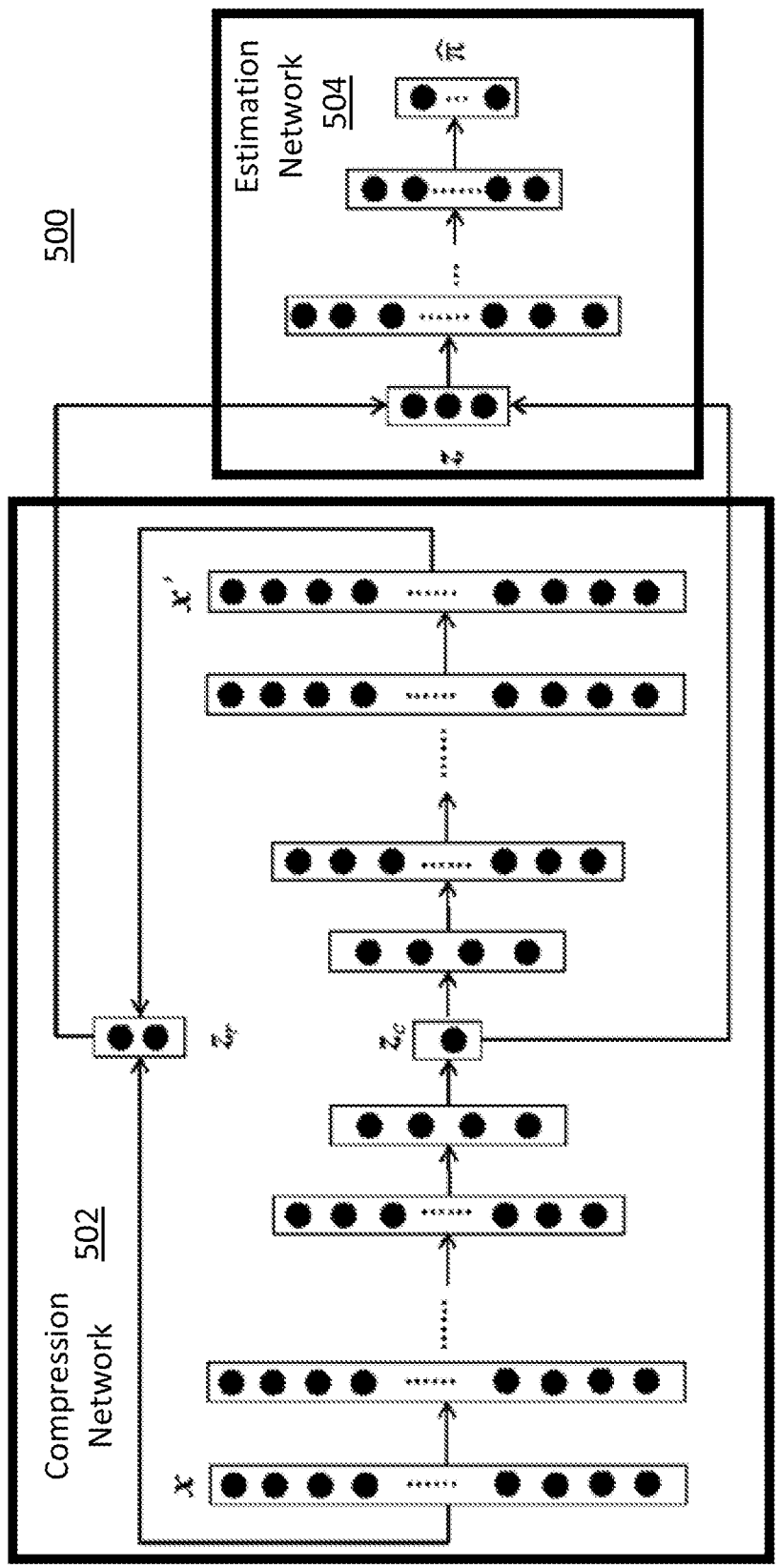
FIG. 5 is a block/flow diagram illustrating a system/method for unsupervised anomaly/outlier detection using a deep autoencoding gaussian mixture model (DAGMM) based Density Estimation Network (DEN), in accordance with the present invention.

Referring now to FIG. 5, a block/flow diagram showing a system/method for performing unsupervised anomaly/outlier detection using a deep autoencoding gaussian mixture model (DAGMM) based Density Estimation Network (DEN) 500 is illustratively depicted in accordance with an embodiment of the present invention.

In some embodiments, the DAGMM-based DEM can include two main components, namely a compression network 502 and an estimation network 504. The compression network 502 can perform dimensionality reduction for input samples by a deep autoencoder, prepare their low-dimensional representations from both the reduced space and the reconstruction error features, and feed the representations to the subsequent estimation network 504 in accordance with the present invention. The estimation network 504 can take the feed as input, and predict their likelihood/energy in the framework of Gaussian Mixture Model (GMM) in accordance with various embodiments of the present invention, which will be described in further detail herein below with reference to FIG. 6.

Figure 6:
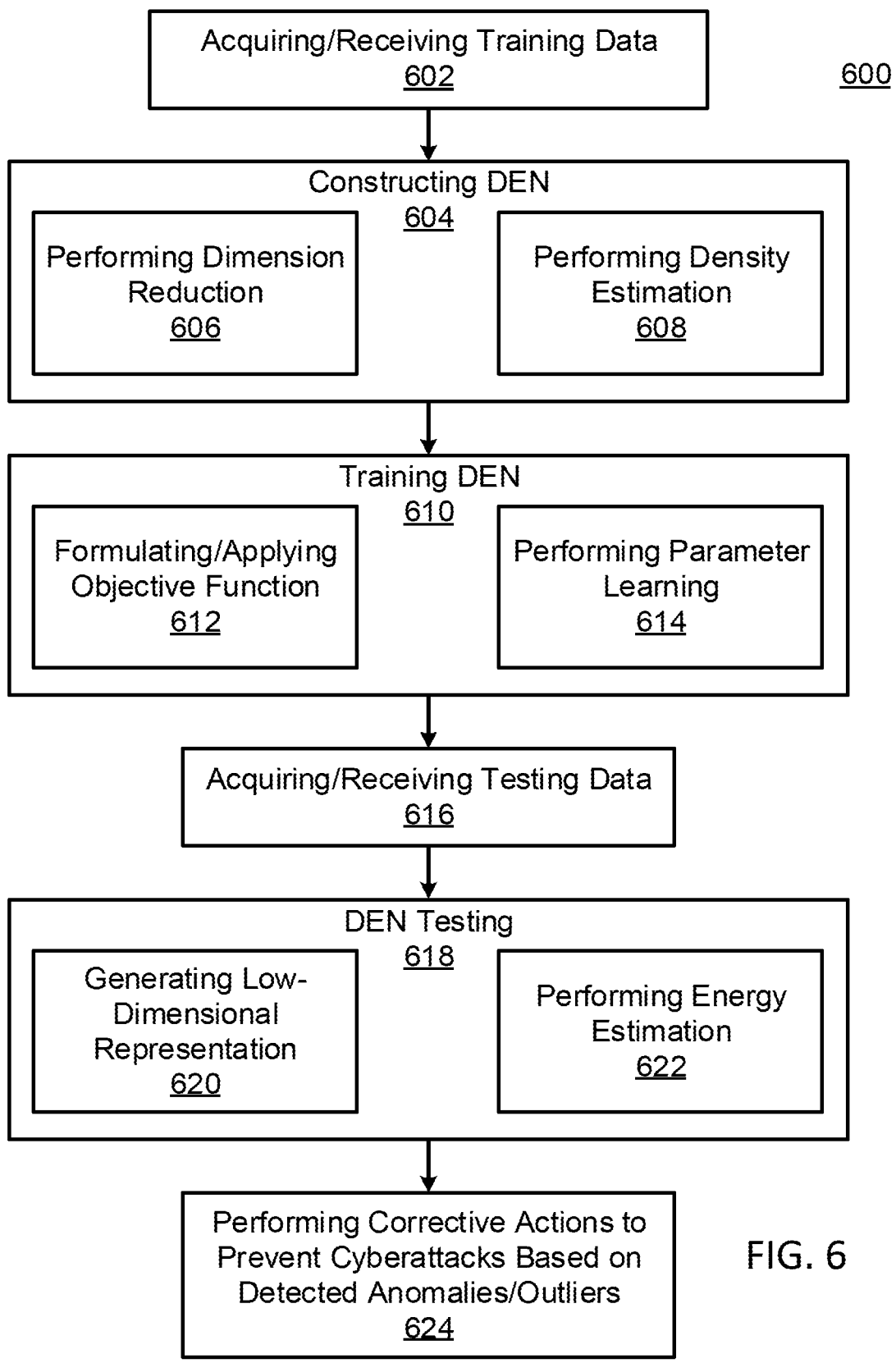
FIG. 6 is a block/flow diagram illustrating a method for constructing and utilizing a Density Estimation Network (DEN) for unsupervised anomaly/outlier detection, in accordance with the present invention.

Referring now to FIG. 6, with continued reference to FIG. 5, a block/flow diagram showing a method 600 for constructing and utilizing a deep autoencoding gaussian mixture model (DAGMM) based Density Estimation Network (DEN) for unsupervised anomaly/outlier detection is illustratively depicted in accordance with an embodiment of the present invention.

In one embodiment, in block 602, training data can be acquired and/or received as input in accordance with the present invention. The data used for training a DEN can be referred to as training data. DEN can take vector representations for the data from real-life applications as its input data for training, and a vector representation for raw data can be represented in several ways in accordance with various embodiments. For example, one numerical feature can directly take one dimension in the vector representation, one categorical feature can be encoded by multiple dimensions, using one-hot representation, and/or with respect to complex features, users have the freedom to derive complex features from raw data by domain knowledge in accordance with the present invention.

In block 604, a DEN can be constructed in accordance with various embodiments of the present invention. In this step, the network structure of DEN that serves the training data can be constructed. In accordance with various embodiments, constructing a DAGMM-based DEM can include two major components, namely a compression network 502 and an estimation network 504. The compression network 502 can perform dimensionality reduction for input samples by a deep autoencoder, prepare their low-dimensional representations from both the reduced space and the reconstruction error features, and feed the representations to the subsequent estimation network 504 in accordance with the present invention. The estimation network 504 can take the feed as input, and predict their likelihood/energy in the framework of Gaussian Mixture Model (GMM) in accordance with various embodiments of the present invention In block 606, dimension compression/reduction can be performed for DEN construction in accordance with various embodiments of the present invention. In some embodiments, dimension reduction can be performed in block 606 using a multi-layer stacked autoencoder in accordance with the present invention, a high-level representation described in further detail with reference to FIG. 7 herein below.

Figure 7:
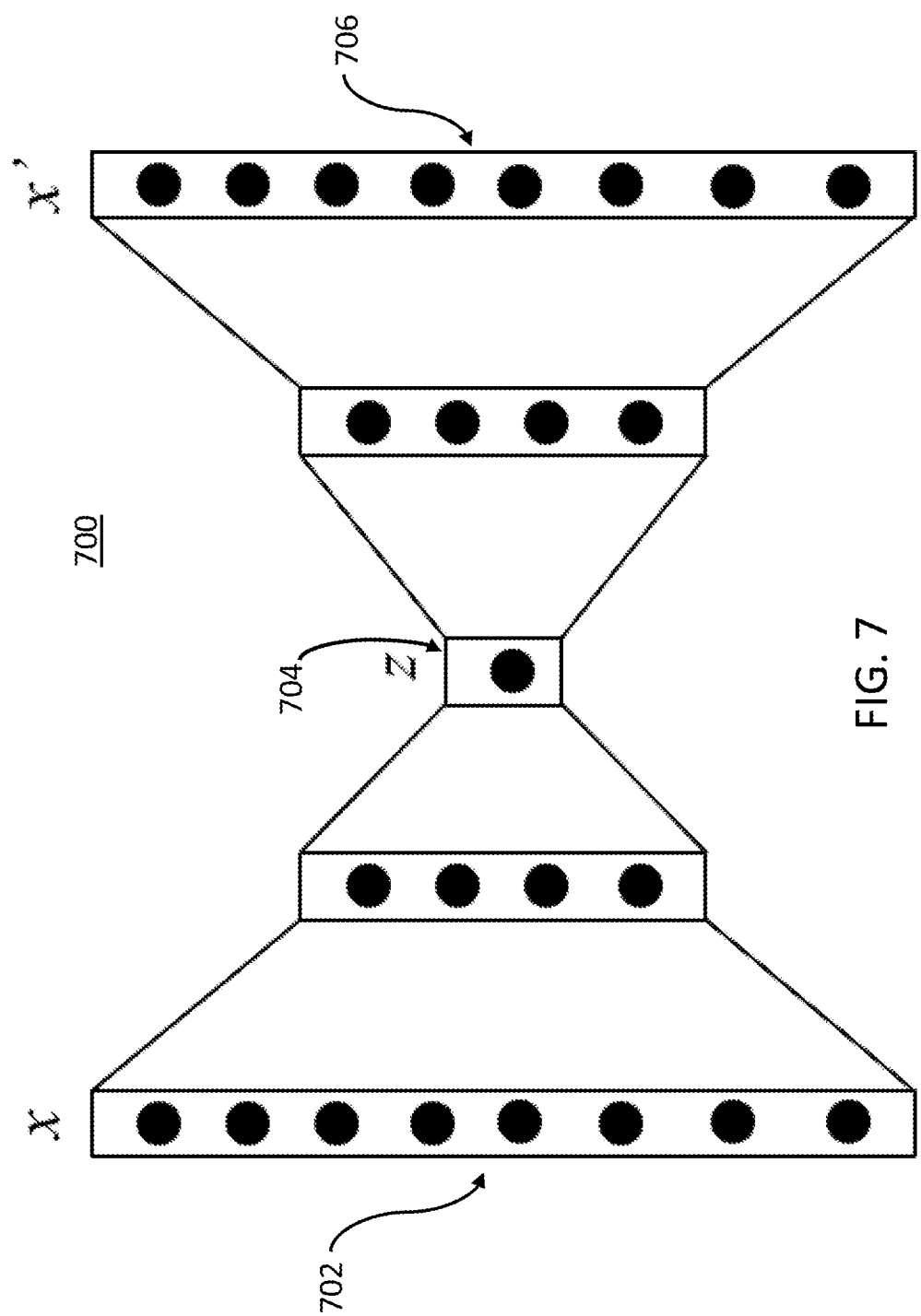
FIG. 7 is a block/flow diagram illustrating an exemplary high-level Dimension Reduction Network (DRN), in accordance with the present invention, in accordance with the present invention.

Referring now to FIG. 7, an exemplary high-level Dimension Reduction Network (DRN) using a multi-layer stacked autoencoder 700 is illustratively depicted in accordance with an embodiment of the present invention. In one embodiment, an input sample is denoted as x 702, its compressed code is denoted as z 704, and its reconstructed sample is denoted as x' 706. In practice, z 704 can generally have a low dimensionality (e.g., 1 or 2). After this step, we are able to perform dimension reduction in DEN.

Referring now back to FIG. 6, with continued reference to FIG. 7, in some embodiments, the low-dimensional representations provided by the compression network 700 includes two sources of features: (1) the reduced low-dimensional representations learned by a deep autoencoder; and (2) the features derived from reconstruction error. Given a sample x, the method 600 can utilize the compression network 700 to compute its low-dimensional representation z in block 606 as follows:

$$z_c = h(x; \theta_e), \quad x' = g(z_c; \theta_d) \quad (1),$$

$$z_r = f(x, x'), \quad (2)$$

$$z = [z_e, z_r], \quad (3)$$

where $z_c$ is the reduced low-dimensional representation learned by the deep autoencoder, $z_r$ includes the features derived from the reconstruction error, $\theta_e$ and $\theta_d$ are the parameters of the deep autoencoder, x' is the reconstructed counterpart of x, h(•) denotes the encoding function, g(•) denotes the decoding function, and f(•) denotes the function of calculating reconstruction error features. In particular, $z_r$ can be multi-dimensional, considering multiple distance metrics (e.g., Euclidean distance, relative Euclidean distance, cosine similarity, etc.). In some embodiments, the compression network 700 can next feed z to the subsequent estimation network for performing density estimation for DEN construction in block 608.

In block 608, Gaussian mixture modeling can be utilized to estimate density functions for training data received as input from block 602, and compressed/reduced in block 606 in accordance with the present invention. Such Gaussian mixture modeling can controlled by three parameters: membership distribution parameter, mixture means, and mixture deviations. Given training data and their membership distribution, the method 600 can estimate mixture means and mixture deviations. However, exact membership distribution is unknown in practice, and the estimation network in 608 can learn the best membership distribution to maximize the likelihood to observe the given training data by Gaussian mixture modeling in accordance with various embodiments of the present invention.

In some embodiments, data for the estimation network in block 608 can be directly collected from a dimension reduction network utilized for the dimension compression/reduction in block 606. In practice, there are generally two sources: (1) compressed code z, and (2) reconstruction error between x and x'. The estimation network in block 608 can be a multi-layer neural network that takes data from one or more of the sources as input, and outputs k-dimensional vectors that represent the membership distribution for individual samples, where k is the number of mixtures in the underlying Gaussian mixture modeling. Given the estimated membership distribution, mixture means and deviations can be directly computed so that observation likelihood for each individual sample can be estimated accordingly. In some embodiments, given the low-dimensional representations for input samples from block 606, the estimation network can perform density estimation 608 under the framework of Gaussian mixture modeling in accordance with the present invention.

In block 610, a DEN (e.g., as constructed in block 604) can be trained in accordance with various embodiments of the present invention. In some embodiments, in block 610, the DEN can automatically adjust model parameters (e.g., in real-time) so that the most important information is preserved in the reduced dimensions and the density function that best characterizes the training data in the reduced dimensions is learned in accordance with the present invention. When more important information is preserved, anomaly detection accuracy will be higher than in conventional systems and methods, as shown by the experimental results on public benchmark described in further detail herein below. The DEN training in block 610 can include with objective function formulation in block 612, and then apply gradient-descent based algorithms to training DEN for parameter learning in block 614 in accordance with various embodiments.

In block 610, in the training phase with unknown mixture-component distribution φ, mixture means μ, and mixture covariance Σ, the estimation network can estimate the parameters of Gaussian mixture modeling (GMM), and can evaluate the likelihood/energy for samples without alternating procedures such as Expectation Maximization. The estimation network can achieve this in block 608 by utilizing a multi-layer neural network to predict the mixture membership for each sample in accordance with the present invention. Given the low-dimensional representations z and an integer K as the number of mixture components, the estimation network can make membership predictions as follows:

$$p = MLN(z; \theta_m), \hat{\gamma} = \text{softmax}(p), \quad (4)$$

where $\hat{\gamma}$ is a K-dimensional vector for the soft mixture-component membership prediction, and p is the output of a multi-layer network parameterized by $\theta_m$ in accordance with the present invention.

In block 614, parameter learning can be performed for training the DEN in accordance with various embodiments of the present invention. In an exemplary embodiment, given a batch of N samples and their membership prediction, $\forall 1 \leq k \leq K$, we can further estimate the parameters in GMM as follows:

$$\hat{\phi}_k = \sum_{i=1}^{N} \frac{\hat{\gamma}_{ik}}{N}, \hat{\mu}_k = \frac{\sum_{i=1}^{N} \hat{\gamma}_{ik} z_i}{\sum_{i=1}^{N} \hat{\gamma}_{ik}}, \hat{\Sigma}_k = \frac{\sum_{i=1}^{N} \hat{\gamma}_{ik} (z_i - \hat{\mu}_k)(z_i - \hat{\mu}_k)^T}{\sum_{i=1}^{N} \hat{\gamma}_{ik}}. \quad (5)$$

where $\hat{\gamma}_i$ is the membership prediction for the low-dimensional representation $z_i$, and $\hat{\phi}_k$, $\hat{\mu}_k$, and $\hat{\Sigma}_k$ represent mixture probability, mean, covariance for component k in GMM, respectively, in accordance with the present invention.

In some embodiments, energy estimation can be performed in block 622 for one or more testing samples in accordance with various embodiments of the present invention. By using the learned estimation network, the energy of a testing sample can be accurately and efficiently estimated. If one sample has a high energy, it can indicate that it resides in a low density area, and can thus be reported as an anomaly or outlier. In practice, a pre-defined threshold can be used to decide whether a sample has high energy, and this threshold can be determined dependent on a variety of factors, including, for example, user-preference, historical results, arbitrary, etc. in accordance with various embodiments of the present invention.

With the estimated parameters, sample energy can be further inferred in block 622 as follows:

$$E(z) = -\log\left(\sum_{k=1}^{K} \hat{\phi}_k \frac{\exp\left(-\frac{1}{2}(z - \hat{\mu}_k)^T \hat{\Sigma}_k^{-1}(z - \hat{\mu}_k)\right)}{\sqrt{|2\pi \hat{\Sigma}_k|}}\right). \quad (6)$$

where |•| denotes the determinant of a matrix, z is the hidden representation of an input sample, $\hat{\mu}_k$ and $\hat{\Sigma}_k$ are the mean and covariance matrix in the k-th component of Gaussian mixture model, pi is approximately 3.14159 (e.g., Archimedes' constant), $\hat{\phi}_k$ is the probability that a sample belongs to the k-th component, and K is the number of components in this Gaussian mixture model in accordance with the present invention. In addition, during the testing phase with the learned GMM parameters from block 618, it is straightforward to estimate sample energy, and predict samples of high energy as anomalies by a pre-chosen threshold in accordance with various embodiments of the present invention.

In block 612, an objective function may be formulated and/or applied for training the DEN in accordance with various embodiments of the present invention. In various embodiments, an objective function J can be formulated for DEN in accordance with the present invention. At a high level, J=reconstruction_error+energy. Reconstruction_error can represent any reconstruction error made by dimension reduction network in DEN in block 606. In an exemplary embodiment, for x and x', the reconstruction error is $\|x-x'\|_2$. The smaller, the better the dimension reduction network compresses the training data. In some embodiments, energy is also called negative likelihood, which is inversely proportional to the likelihood that one can observe the given training data under the current parameterized Gaussian mixture model. The smaller, the better the Gaussian mixture model fits the training data. In sum, by minimizing J, the most accurate and efficient DEN that works for anomaly detection can be determined and/or constructed in accordance with various embodiments of the present invention.

In block 614, parameter learning can be performed, and by the objective function J defined in block 612, we can apply off-the-shelf gradient-descent based learning algorithms and automatically adjusts parameters in DEN by back-propagation in accordance with various embodiments of the present invention.

In some embodiments, given a dataset of N samples, the objective function that guides DAGMM-based DEN training can be constructed as follows.

$$J(\theta_e, \theta_d, \theta_m) = \frac{1}{N}\sum_{i=1}^{N} L(x_i, x'_i) + \frac{\lambda_1}{N}\sum_{i=1}^{N} E(z_i) + \lambda_2 P(\hat{\Sigma}). \quad (7)$$

where N is the number of training samples, $x_i$ is input sample i, $z_i$ is the hidden representation of $x_i$, $x'_i$ is the reconstructed sample i based on $z_i$, $\Sigma$ is the covariance matrices of GMM, $\lambda_1$ is a meta parameter that tunes the impact from the $2^{nd}$ term, and $\lambda_2$ is another meta parameter that tunes the impact from the $3^{rd}$ term in accordance with the present invention.

In various embodiments of the present invention, the objective function formulated in block 612 can include three components, described in further detail herein below. For example, $L(x_i, x'_i)$ can represent the loss function that characterizes the reconstruction error caused by the deep autoencoder in the compression network. Intuitively, if the compression network could make the reconstruction error low, the low-dimensional representation could better preserve the key information of input samples. Therefore, a compression network of lower reconstruction error is always desired. In practice, $L_2$-norm usually gives desirable results, as $L(x_i, x'_i) = \|x_i - x'_i\|_2^2$, where $x_i$ is sample i, and $x'_i$ is the reconstructed sample based on its hidden representation in accordance with the present invention. $E(z_i)$ can model the probabilities that we could observe the input samples. By minimizing the sample energy, the best combination of compression and estimation networks that maximize the likelihood to observe input samples is determined in accordance with various embodiments of the present invention.

In some embodiments, DAGMM also has the singularity problem as in GMM: trivial solutions are triggered when the diagonal entries in covariance matrices denigrate to 0. To avoid this issue, the present invention can penalize small values on the diagonal entries by $$P(\hat{\Sigma}) = \sum_{k=1}^{K}\sum_{j=1}^{d} \frac{1}{\hat{\Sigma}_{kjj}},$$

where d is the number of dimensions in the low-dimensional representations provided by the compression network. $\lambda_1$ and $\lambda_2$ are the meta parameters in DAGMM. In practice, $\lambda_1=0.1$ and $\lambda_2=0.005$ have been determined to render desirable, accurate, and efficient results in accordance with various embodiments of the present invention.

During the training of the DEN in block 610, unlike conventional deep autoencoder based methods that require pre-training, the DAGMM-based DEN employs end-to-end training in accordance with various embodiments of the present invention. First, in our study, we find that pre-trained compression networks suffer from limited anomaly detection performance, as it is difficult to make significant changes in the well-trained deep autoencoder to favor the subsequent density estimation tasks. Second, we also find that the compression network and estimation network could mutually boost each other's performance. On one hand, with the regularization introduced by the estimation network, the deep autoencoder in the compression network learned by end-to-end training can reduce reconstruction error as low as the error from its pre-trained counterpart, which meanwhile cannot be achieved by simply performing end-to-end training with the deep autoencoder alone. On the other hand, with the well-learned low-dimensional representations from the compression network, the estimation network is able to make meaningful density estimations. A real-world example from a public benchmark dataset will be described in further detail herein below with reference to FIG. 9 to highlight the differences in accuracy, performance, and computational efficiency between pre-training techniques and the advantageous end-to-end training using the DAGMM-based DEN in accordance with various embodiments of the present invention.

In block 616, testing data can be acquired and/or received in accordance with various embodiments of the present invention. In testing phase, any incoming data can be referred to as testing data, and an identical method as employed in block 602 can be performed to convert any testing data into their vector representation in accordance with the present invention.

In block 618, DEN testing can be performed in accordance with various embodiments of the present invention. In this step, the model learned from the DEN training in block 610 can be utilized to predict whether a testing sample resides in any low density area, and if determined to be yes, this sample can be reported as an anomaly/outlier, and appropriate corrective action can be performed in accordance with the present invention.

In block 620, a low-dimensional representation of acquired/received input can be generated for testing using a DEN in accordance with various embodiments of the present invention. By sending a test sample to DEN, its learned dimension reduction network can convert the input vector into a low-dimensional vector (e.g., 3 or 4 dimensions) in accordance with the present invention.

In block 622, the DAGMM-based DEN can leverage the estimation network to make membership prediction for each sample in accordance with various embodiments of the present invention. From the view of probabilistic graphical models, the estimation network plays an analogous role of latent variable (e.g., sample membership) inference. Recently, neural variational inference has been proposed to employ deep neural networks to tackle difficult latent variable inference problems, where exact model inference is intractable and conventional approximate methods cannot scale well. In some embodiments, can also adapt the membership prediction task of DAGMM into the framework of neural variational inference. For example, given sample $x_i$, the contribution of its compressed representation $z_i$ to the energy function can be upper-bounded as follows:

$$E(z_i) = -\log p(z_i) = -\log \sum_k p(z_i, k)$$

$$= -\log \sum_k Q_{\theta_m}(k|z_i) \frac{p(z_i,k)}{Q_{\theta_m}(k|z_i)}$$

$$\leq -\sum_k Q_{\theta_m}(k|z_i) \log \frac{p(z_i,k)}{Q_{\theta_m}(k|z_i)}$$

$$= -E_{Q_{\theta_m}}[\log p(z_i, k) - \log Q_{\theta_m}(k|z_i)] \quad (8)$$

$$= -E_{Q_{\theta_m}}[\log p(z_i|k)] + KL(Q_{\theta_m}(k|z_i) \parallel p(k)) \quad (9)$$

$$= -\log p(z_i) + KL(Q_{\theta_m}(k|z_i) \parallel p(k|z_i))$$

$$= E(z_i) + KL(Q_{\theta_m}(k|z_i) \parallel p(k|z_i)) \quad (10)$$

where $Q_{\theta_m}(k|z_i)$ is the estimation network that predicts the membership of $z_i$, $KL(\cdot\|\cdot)$ is the Kullback-Leibler divergence between two input distributions, $p(k)=\phi_k$ is the mixing coefficient to be estimated, and $p(k|z_i)$ is the posterior probability distribution of mixture component k given $z_i$ in accordance with the present invention.

By minimizing the negative evidence lower bound in Equation (8), we can make the estimation network approximate the true posterior and tighten the bound of energy function. In various embodiments, we use Equation (6) as a part of the objective function instead of its upper bound in Equation (10) simply because the energy function of DAGMM is tractable and efficient to evaluate. Unlike neural variational inference that uses the deep estimation network to define a variational posterior distribution as described above, DAGMM explicitly employs the deep estimation network to parametrize a sample-dependent prior distribution. In the history of machine learning research, there were research efforts towards utilizing neural networks to calculate sample membership in mixture models, such as adaptive mixture of experts. From this perspective, the DAGMM-based DEN can be employed as a powerful deep unsupervised version of adaptive mixture of experts in combination with a deep autoencoder in accordance with various embodiments of the present invention.

In block 624, one or more corrective actions (e.g., quarantine, power down components, braking/steering/accelerating vehicle, etc.) can be performed (e.g., automatically, at scheduled intervals, responsive to an attack alert to a device owner, etc.) to prevent cyberattacks and/or maintain normal system functionality in accordance with various embodiments of the present invention.

In accordance with various embodiments, the DAGMM-based DEN of the present invention includes novel features that provide significant performance and processor resource benefits over conventional systems and methods. For example, a new deep learning architecture that performs dimension reduction and density estimation can be employed, and the resulting DEN is a powerful tool that works well with high dimensional data with potentially contaminated training data. A new learning and testing algorithm/method, which includes a defined objective function that gives important guidance for existing learning algorithm to searching for an optimal DEN, and the decisive step that reports whether a testing sample is an outlier/anomaly and/or performs real-time corrective actions to prevent cyberattacks in accordance with various embodiments of the present invention.

Figure 8:
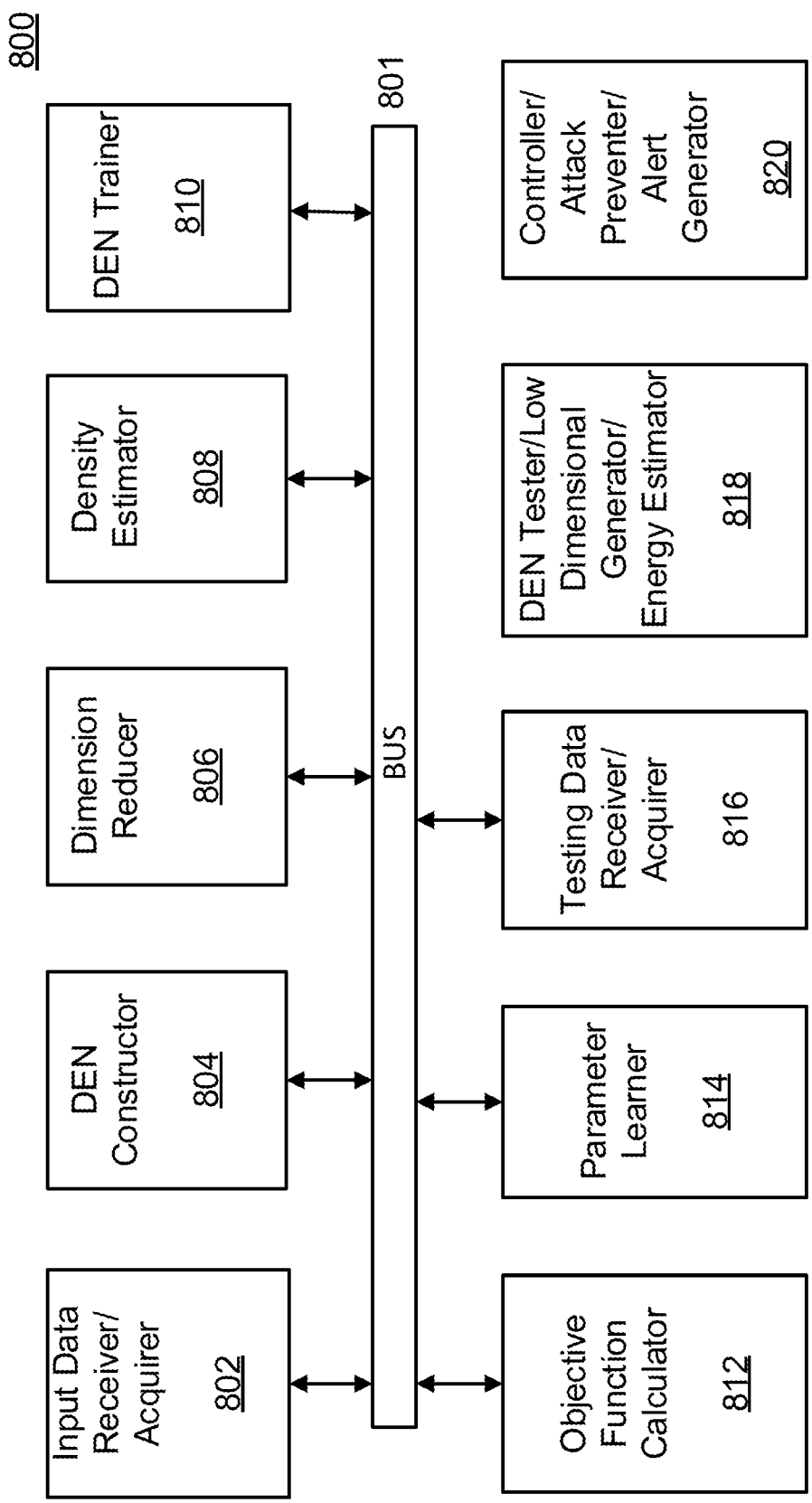
FIG. 8 is a block/flow diagram illustrating a system for unsupervised anomaly/outlier detection using a constructed Density Estimation Network (DEN), in accordance with the present invention.

Referring now to FIG. 8, a block/flow diagram showing a system 800 for unsupervised anomaly/outlier detection using a constructed Density Estimation Network (DEN) is illustratively depicted in accordance with an embodiment of the present invention.

In block 802, a receiver may receive/acquire input data for processing using a DEN constructor 804 in accordance with various embodiments of the present invention. A dimension reducer 806 and density estimator 808 can be included in the DEN constructor 804 for optimal DEN construction. A DEN trainer 810 can be employed for training a DAGMM-based DEN, and may further include an objective function calculator 812 and/or a parameter learner 814. A testing data receiver/acquirer 816 can be employed for acquiring and/or receiving testing data, and a DEN Tester 818 can be employed as a low-dimensional generator and/or energy estimator in accordance with various embodiments. A controller/attack preventer/alert generator 820 can be utilized with the constructed DAGMM-based DEN for prevention of attacks (e.g., spoofing, zero-day, etc.), and/or performing corrective actions (e.g., quarantine, IP blocking, power down components, steer/brake/accelerate vehicle, etc.) in accordance with various embodiments of the present invention.

Figure 9:
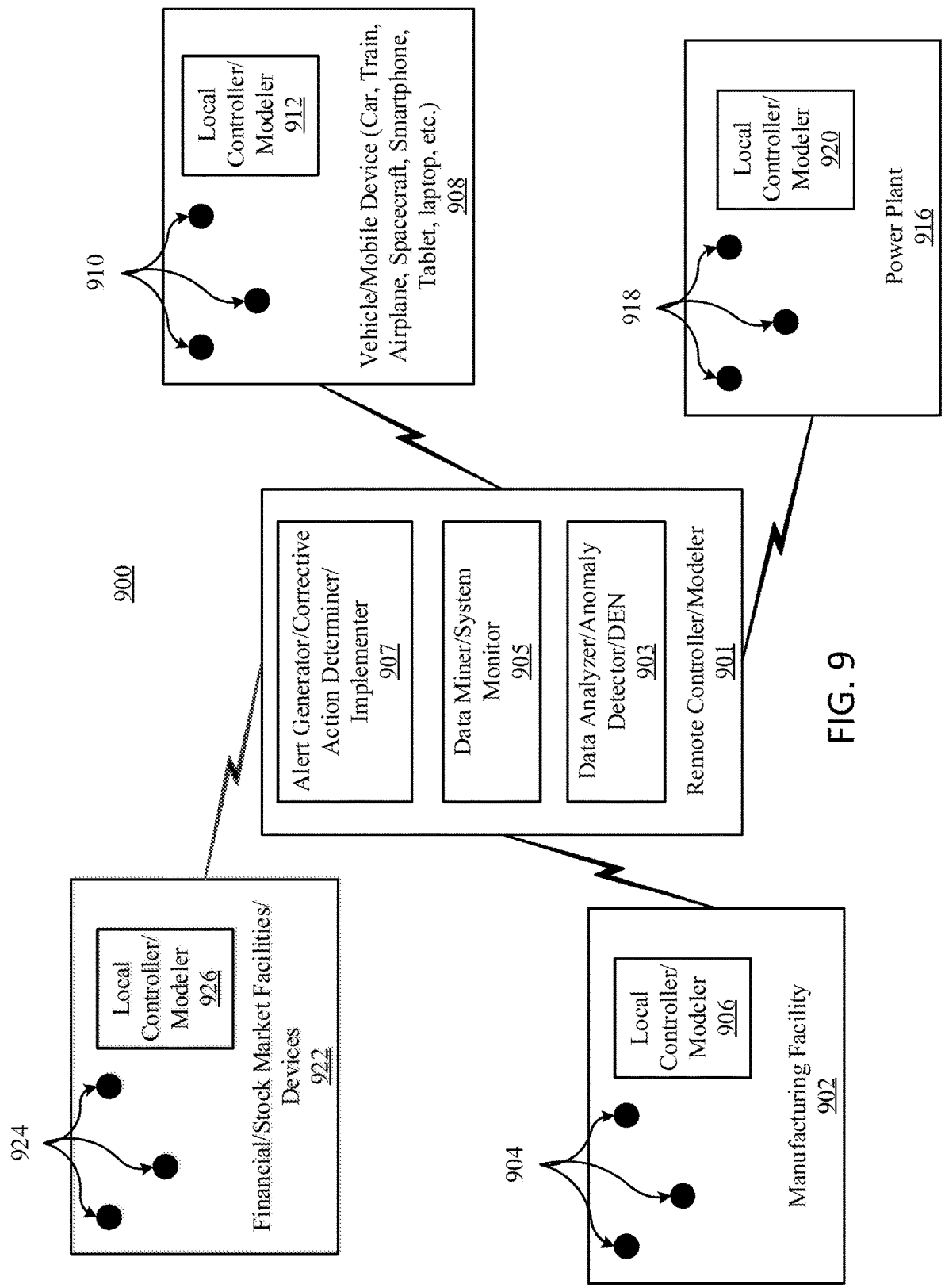
FIG. 9 is a block/flow diagram illustrating a system/method for prevention of cyberattacks using a Density Estimation Network (DEN), in accordance with the present invention.

Referring now to FIG. 9, a block/flow diagram showing a high-level system/method for anomaly/outlier detection and prevention of cyberattacks using a constructed Density Estimation Network (DEN) is illustratively depicted in accordance with an embodiment of the present invention. In various embodiments, the system 900 can monitor and control one or more complex physical systems using a DEN. A remote controller/modeler 901 may be employed to manage and control operations of a plurality of complex physical systems, including, for example, a manufacturing facility 902, a vehicle/mobile communication device 908 (e.g., car, train, airplane, smartphone, tablet, laptop, spacecraft, etc.), a power plant 916, financial/stock market facilities/servers 922, etc. in accordance with the present principles. The remote controller/modeler 901 may perform all or some of the steps described with respect to the methods 500, 600, 700, and 900 of FIGS. 5, 6, 7, and 9, respectively, in accordance with various embodiments.

The remote controller/modeler 901 may include a DEN-based data analyzer/anomaly detector 903 for determining when an anomaly occurs, and the cause of such an anomaly in the facilities/devices 902, 908, 916, 922. An alert generator/corrective action determiner/implementer 907 may be employed to alert facility workers of a detected anomaly using any of a plurality of communication interfaces (e.g., cell phone, email, sound alarm in facility, etc.), and a corrective action to resolve the anomaly condition and/or to prevent future anomalies may be determined and/or implemented in block 907, and executed using the remote controller/modeler 901.

The anomalies detected may be detected using a DEN from data mined from monitoring the facilities 902, 908, 916, 922 (e.g., from sensors, deployed throughout the facilities/vehicles 902, 908, 916, 922, reports, etc.) using a data miner/system monitor 905, and deep autoencoding gaussian mixture model (DAGMM) based Density Estimation Network (DEN) described above with reference to systems/methods 100, 200, 300, 400, 500, 600, 700, and 800 of FIGS. 1, 2, 3, 4, 5, 6, 7, and 8, respectively, in accordance with various embodiments of the present invention. The sensors 904, 910, 918, 924 may include any of a plurality of sensors (e.g., temperature, pressure, network traffic, etc.) that are capable of being deployed in a particular type of facility/vehicle/etc. It is noted that the functions of the remote controller/modeler 901 may also be performed locally using a local controller/modeler 906, 912, 920, 926 in accordance with various embodiments of the present invention.

In accordance with various embodiments, the remote controller/modeler 901 includes a novel DEN-based data analytic engine/anomaly detector 903 for automatic anomaly detection and/or complex physical system self-management. Based at least in part on the strong regularity and high diversity data characteristics observed in physical systems, the system 900 profiles the system monitoring data with an ensemble of models, each of which has discovered a specific data property. The extracted data profiles may be utilized to facilitate and/or automate a plurality of management tasks (e.g., system status monitoring, online anomaly detection, etc.) The experimental results in real-world environments have demonstrated that a plurality of system metrics and actions can be monitored and controlled using the system 900 using the DEN-based data analyzer/anomaly detector 903 in accordance with various embodiments of the present invention.

In some embodiments, the system 900 can prevent cyber-attacks (e.g., spoofing attacks, zero-day attacks, data breaches, etc.) using the controller/modelers 901, 906, 912, 920, 926 using the DEN-based data analytic engine/anomaly detector 903 for automatic anomaly detection in accordance with the present invention. It is noted that the local controllers/modelers 906, 912, 920, 926 can perform all the same functions as the controller/modeler 901 (e.g., DEN-based anomaly detection, system monitoring, alert generation, corrective action control, etc.) in accordance with various embodiments.

In some embodiments, a plurality of types of abnormal situations (e.g., system inspection anomaly event, data outliers, overheating, pressure alerts, etc.) in one or more complex physical systems 902, 908, 916, 922 have been successfully detected in practice. The DEN-based data analyzer/anomaly detector 903 detects and reports anomaly status significantly more quickly (e.g., several hours faster) than any conventional systems and methods based on the modeling and analysis performed by the remote controller/modeler 901. This increased detection and reporting with faster response times (e.g., near real-time) of, for example, detection of system anomalies, enables correction of such anomalies, using one or more of the controllers 901, 906, 912, 920, 926, to increase productivity and minimize outages at one or more of a plurality of systems 902, 908, 916, 922 in accordance with various embodiments of the present principles.

In an illustrative embodiment, spoofing attack detection and prevention can be performed by the remote controller/modeler 901 and/or one or more of the local controller modelers 906, 912, 920, 926 in accordance with the present invention. In some embodiments, two phases (e.g., training phase, testing phase) can be employed for spoofing attack detection and prevention. The training phase can be an offline phase, and network traffic data can be collected, and each network flow can be represented as a feature vector (e.g., $x_i$) using domain-knowledge (e.g., spoofing attack) based feature engineering. Using these feature vectors as training data, the DAGMM-based DEN can be trained in accordance with the present invention.

The testing phase can be an online phase. The trained DAGMM-based DEN system 900 can be installed as, for example, a software component into network traffic monitors (e.g., firewalls), serving as one of the detectors. When a network flow is captured, this software can first transform this flow into its feature vector (e.g., as done in training phase), and then test this feature vector using the trained DEN in accordance with various embodiments of the present invention. When E(z) (Equation 6) of a testing sample is higher than a pre-defined threshold, the corresponding network flow can be reported as an anomaly and is that it is likely to be a spoofing attack network flow. Depending on business logic, such suspicious network traffic could be directly filtered out (e.g., in real-time) and/or stored in a database and/or reported to network administrators for deep investigation to prevent any similar future attacks in accordance with the present invention.

In accordance with various embodiments, real-world experimental results utilizing public benchmark datasets are described herein below to demonstrate the effective of the DAGMM-based DEN system 900 in accordance with the present invention.

For ease of illustration, four benchmark datasets are employed for comparison, namely KDDCUP, Thyroid, Arrhythmia, and KDDCUP-Rev, statistics of which are shown in Table 1 below:

TABLE 1

Statistics of Public Benchmark Databases

| | # Dimensions | # Instances | Anomaly ratio ($\rho$) |
|---|---|---|---|
| KDDCUP | 120 | 494,021 | 0.2 |
| Thyroid | 6 | 3,772 | 0.025 |
| Arrhythmia | 274 | 452 | 0.15 |
| KDDCUP-Rev | 120 | 121,597 | 0.2 |

The data for these datasets The KDDCUP (e.g., KDD-CUP99 10 percent dataset from the UCI repository) originally contains samples of 41 dimensions, where 34 of them are continuous and 7 are categorical. For categorical features, we further use one-hot representation to encode them, and eventually we obtain a dataset of 120 dimensions. As 20% of data samples are labeled as "normal" and the rest are labeled as "attack", "normal" samples are in a minority group; therefore, "normal" ones are treated as anomalies in this task.

The Thyroid dataset is obtained from the Stonybrook University ODDS repository. There are 3 classes in the original dataset. In this task, the hyperfunction class is treated as anomaly class and the other two classes are treated as normal class, because hyperfunction is a clear minority class. The Arrhythmia dataset is also obtained from the ODDS repository. The smallest classes, including 3, 4, 5, 7, 8, 9, 14, and 15, are combined to form the anomaly class, and the rest of the classes are combined to form the normal class. The KDDCUP-Rev dataset is derived from KDDCUP. We keep all the data samples labeled as "normal" and randomly draw samples labeled as "attack" so that the ratio between "normal" and "attack" is 4:1. In this way, we obtain a dataset with anomaly ratio 0.2, where "attack" samples are in a minority group and treated as anomalies. Note that "attack" samples are not fixed, and we randomly draw "attack" samples in every single run.

For baseline methods, we consider both traditional and state-of-the-art deep learning methods as baselines, including the following: 1. One-class support vector machine (OC-SVM), which is a popular kernel-based method used in anomaly detection. In the experiment, we employ the widely adopted radial basis function (RBF) kernel in all the tasks; 2. Deep structured energy-based model (DSEBM), which is a state-of-the-art deep learning method for unsupervised anomaly detection. In DSEBM-e, sample energy is leveraged as the criterion to detect anomalies; 3. DSEBM-r. DSEBM-e and DSEBM-r share the same core technique, but reconstruction error is used as the criterion in DSEBM-r for anomaly detection; and 4. Deep clustering network (DCN), which is a state-of-the-art clustering algorithm that regulates autoencoder performance by k-means. In various embodiments, the present invention can adapt this technique for anomaly detection tasks. In particular, the distance between a sample and its cluster center is taken as the criterion for anomaly detection, and samples that are farther from their cluster centers are comparatively more likely to be anomalies.

Moreover, we include descriptions of the following DAGMM variants as baselines to demonstrate the importance of individual components in DAGMM-based DEN in accordance with various embodiments of the present invention. Exemplary variants can include the following:

GMM-EN: In this variant, we remove the reconstruction error component from the objective function of DAGMM. In other words, the estimation network in DAGMM performs membership estimation without the constraints from the compression network. With the learned membership estimation, we infer sample energy by Equations 5 and 6 under the GMM framework. Sample energy is used as the criterion for anomaly detection;

PAE: We obtain this variant by removing the energy function from the objective function of DAGMM, and this DAGMM variant is equivalent to a deep autoencoder. To ensure the compression network is well trained, we adopt the pre-training strategy in accordance with various embodiments. Sample reconstruction error is the criterion for anomaly detection;

E2E-AE: This variant shares the same setting with PAE, but the deep autoencoder is learned by end-to-end training. Sample reconstruction error is the criterion for anomaly detection;

PAE-GMM-EM: This variant adopts a two-step approach. At step one, we learn the compression network by pre-training deep autoencoder. At step two, we use the output from the compression network to train the GMM by a traditional EM algorithm. The training procedures in the two steps are separated. Sample energy is used as the criterion for anomaly detection;

PAE-GMM: This variant also adopts a two-step approach. At step one, we learn the compression network by pre-training deep autoencoder. At step two, we use the output from the compression network to train the estimation network. The training procedures in the two steps are separated. Sample energy is used as the criterion for anomaly detection;

DAGMM-p: This variant is a compromise between DAGMM and PAE-GMM. We first train the compression network by pre-training, and then fine-tune DAGMM by end-to-end training. Sample energy is the criterion for anomaly detection; and DAGMM-NVI: The only difference between this variant and DAGMM is that this variant adopts a framework of neural variational inference and replaces Equation (6) with the upper bound in Equation (10) as a part of the objective function in accordance with various embodiments of the present invention.

In an exemplary configuration for the DAGMM-based DEN system 900, in real-world experiments, we consider two reconstruction features from the compression network: relative Euclidean distance and cosine similarity. Given a sample x and its reconstructed counterpart x', their relative Euclidean distance can be defined as $$\frac{\|x-x'\|_2}{\|x\|_2},$$

and the cosine similarity can be derived by $$\frac{x \cdot x'}{\|x\|_2 \|x'\|_2}.$$

In various embodiments, network structures of the DAGMM-based DEN system 900 used on individual datasets can be summarized as follows:

KDDCUP: For this dataset, its compression network provides 3-dimensional input to the estimation network, where one is the reduced dimension and the other two are from the reconstruction error. The estimation network considers a GMM with 4 mixture components for the best performance. In particular, the compression network runs with FC(120, 60, tanh)-FC(60, 30, tanh)-FC(30, 10, tanh)-FC(10, 1, none)-FC(1, 10, tanh)-FC(10, 30, tanh)-FC(30, 60, tanh)-FC(60, 120, none), and the estimation network performs with FC(3, 10, tanh)-Drop(0.5)-FC(10, 4, softmax);

Thyroid: The compression network for this dataset also provides 3-dimensional input to the estimation network, and the estimation network employs 2 mixture components for the best performance. In particular, the compression network runs with FC(6, 12, tanh)-FC(12, 4, tanh)-FC(4, 1, none)-FC(1, 4, tanh)-FC(4, 12, tanh)-FC(12, 6, none), and the estimation network performs with FC(3, 10, tanh)-Drop(0.5)-FC(10, 2, softmax);

Arrhythmia: The compression network for this dataset provides 4-dimensional input, where two of them are the reduced dimensions, and the estimation network adopts a setting of 2 mixture components for the best performance. In particular, the compression network runs with FC(274, 10, tanh)-FC(10, 2, none)-FC(2, 10, tanh)-FC(10, 274, none), and the estimation network performs with FC(4, 10, tanh)-Drop(0.5)-FC(10, 2, softmax); and KDDCUP-Rev: For this dataset, its compression network provides 3-dimensional input to the estimation network, where one is the reduced dimension and the other two are from the reconstruction error. The estimation network considers a GMM with 2 mixture components for the best performance. In particular, the compression network runs with FC(120, 60, tanh)-FC(60, 30, tanh)-FC(30, 10, tanh)-FC(10, 1, none)-FC(1, 10, tanh)-FC(10, 30, tanh)-FC(30, 60, tanh)-FC(60, 120, none), and the estimation network performs with FC(3, 10, tanh)-Drop(0.5)-FC(10, 2, softmax), where FC(a, b, $f$) means a fully-connected layer with a input neurons and b output neurons activated by function $f$ (none means no activation function is used), and Drop(p) denotes a dropout layer with keep probability p during training in accordance with various embodiments of the present invention.

In these real-world experiments, for ease of illustration, All the DAGMM-based DEN instances are implemented by Tensorflow, and trained by the Adam optimization algorithm with learning rate 0.0001. For KDDCUP, Thyroid, Arrhythmia, and KDDCUP-Rev, the number of training epochs are 200, 20000, 10000, and 400, respectively. For the sizes of mini-batches, they are set as 1024, 1024, 128, and 1024, respectively. Moreover, in all the DAGMM instances, we set λ1 as 0.1 and λ2 as 0.005 in accordance with the present invention.

With respect to accuracy, metrics of the real-world experiments include average precision, recall, and $F_1$ score as intuitive ways to compare anomaly detection performance. In particular, based on the anomaly ratios shown in Table 1, the present invention can select the threshold to identify anomalous samples. For example, when DAGMM performs on KDDCUP, the top 20% samples of the highest energy can be marked as anomalies. We take anomaly class as positive, and define precision, recall, and $F_1$ score accordingly. In the first set of experiments, we use settings with completely clean training data: in each run, we take 50% of data by random sampling for training with the rest 50% reserved for testing, and only data samples from the normal class are used for training models.

Table 2 (below) reports the average precision, recall, and $F_1$ score after 20 runs for DAGMM and its baselines. In general, DAGMM demonstrates superior performance over the baseline methods in terms of $F_1$ score on all the datasets. Especially on KDDCUP and KDDCUP-Rev, DAGMM achieves 14% and 10% improvement at $F_1$ score, compared with the existing methods. For OC-SVM, the curse of dimensionality could be the main reason that limits its performance. For DSEBM, while it works reasonably well on multiple datasets, DAGMM outperforms as both latent representation and reconstruction error are jointly considered in energy modeling. For DCN, PAE-GMM, and DAGMM-p, their performance could be limited by the pre-trained deep autoencoders. When a deep autoencoder is well-trained, it is hard to make any significant change on the reduced dimensions and favor the subsequent density estimation tasks. For GMM-EN, without the reconstruction constraints, it seems difficult to perform reasonable density estimation. In terms of PAE, the single view of reconstruction error may not be sufficient for anomaly detection tasks. For E2E-AE, we observe that it is unable to reduce reconstruction error as low as PAE and DAGMM do on KDDCUP, KDDCUP-Rev, and Thyroid. As the key information of data could be lost during dimensionality reduction, E2E-AE suffers poor performance on KDDCUP and Thyroid. In addition, the performance of DAGMM and DAGMM-NVI is quite similar. As GMM is a fairly simple graphical model, we cannot spot significant improvement brought by neural variational inference in DAGMM.

TABLE 2

Average precision, recall and $F_1$ from DAGMM-based DEN and the baseline methods. For each metric, the best result is shown in bold.

| | KDDCUP | | | Thyroid | | |
|---|---|---|---|---|---|---|
| Method | Precision | Recall | $F_1$ | Precision | Recall | $F_1$ |
| OC-SVM | 0.7457 | 0.8523 | 0.7954 | 0.3639 | 0.4239 | 0.3887 |
| DSEBM-r | 0.1972 | 0.2001 | 0.1987 | 0.0404 | 0.0403 | 0.0403 |
| DSEBM-e | 0.7369 | 0.7477 | 0.7423 | 0.1319 | 0.1319 | 0.1319 |
| DCN | 0.7696 | 0.7829 | 0.7762 | 0.3319 | 0.3196 | 0.3251 |
| GMM-EN | 0.1932 | 0.1967 | 0.1949 | 0.0213 | 0.0227 | 0.0220 |
| PAE | 0.7276 | 0.7397 | 0.7336 | 0.1894 | 0.2062 | 0.1971 |
| E2E-AE | 0.0024 | 0.0025 | 0.0024 | 0.1064 | 0.1316 | 0.1176 |
| PAE-GMM-EM | 0.7183 | 0.7311 | 0.7246 | 0.4745 | 0.4538 | 0.4635 |
| PAE-GMM | 0.7251 | 0.7384 | 0.7317 | 0.4532 | 0.4881 | 0.4688 |
| DAGMM-p | 0.7579 | 0.7710 | 0.7644 | 0.4723 | 0.4725 | 0.4713 |
| DAGMM-NVI | 0.9290 | 0.9447 | 0.9368 | 0.4383 | 0.4587 | 0.4470 |
| DAGMM | 0.9297 | 0.9442 | 0.9369 | 0.4766 | 0.4834 | 0.4782 |

| | Arrhythmia | | | KDDCUP-Rev | | |
|---|---|---|---|---|---|---|
| Method | Precision | Recall | $F_1$ | Precision | Recall | $F_1$ |
| OC-SVM | 0.5397 | 0.4082 | 0.4581 | 0.7148 | 0.9940 | 0.8316 |
| DSEBM-r | 0.1515 | 0.1513 | 0.1510 | 0.2036 | 0.2036 | 0.2036 |
| DSEBM-e | 0.4667 | 0.4565 | 0.4601 | 0.2212 | 0.2213 | 0.2213 |
| DCN | 0.3758 | 0.3907 | 0.3815 | 0.2875 | 0.2895 | 0.2885 |
| GMM-EN | 0.3000 | 0.2792 | 0.2886 | 0.1846 | 0.1746 | 0.1795 |
| PAE | 0.4393 | 0.4437 | 0.4403 | 0.7835 | 0.7817 | 0.7826 |
| E2E-AE | 0.4667 | 0.4538 | 0.4591 | 0.7434 | 0.7463 | 0.7448 |
| PAE-GMM-EM | 0.3970 | 0.4168 | 0.4056 | 0.2822 | 0.2847 | 0.2835 |
| PAE-GMM | 0.4575 | 0.4823 | 0.4684 | 0.6307 | 0.6278 | 0.6292 |
| DAGMM-p | 0.4909 | 0.4679 | 0.4787 | 0.2750 | 0.2810 | 0.2780 |
| DAGMM-NVI | 0.5091 | 0.4892 | 0.4981 | 0.9211 | 0.9211 | 0.9211 |
| DAGMM | 0.4909 | 0.5078 | 0.4983 | 0.9370 | 0.9390 | 0.9380 |

In the second set of experiments, we investigate how the DAGMM-based DEN system 900 responds to contaminated training data. In each run, we reserve 50% of data by random sampling for testing. For the rest 50%, we take all samples from the normal class mixed with c % of samples from the anomaly class for model training.

Table 3 (below) reports the average precision, recall, and $F_1$ score after 20 runs of DAGMM, DCN, DSEBM-e, and OC-SVM on the KDDCUP dataset, respectively. As expected, contaminated training data negatively affect detection accuracy. When contamination ratio c increases from 1% to 5%, average precision, recall, and $F_1$ score decrease for all the methods. However, the DAGMM-based DEN system 900 in accordance with the present invention is able to maintain effective detection accuracy with 5% or more contaminated data. For OC-SVM, we adopt the same parameter setting used in the experiment with clean training data, and observe that OC-SVM is more sensitive to contamination ratio. In order to receive better detection accuracy, it is important to train a model with high-quality data (i.e., clean or keeping contamination ratio as low as possible). From the real-world experimental results, it is shown that a DAGMM-based DEN system 900 learned by end-to-end training achieves state-of-the-art accuracy on the public benchmark datasets, and provides an improved system and method for unsupervised anomaly detection in accordance with various embodiments of the present invention.

TABLE 3

Anomaly detection results on contaminated training data from KDDCUP.

| | DAGMM | | | DCN | | |
|---|---|---|---|---|---|---|
| Ratio c | Precision | Recall | $F_1$ | Precision | Recall | $F_1$ |
| 1% | 0.9201 | 0.9337 | 0.9268 | 0.7585 | 0.7611 | 0.7598 |
| 2% | 0.9186 | 0.9340 | 0.9262 | 0.7380 | 0.7424 | 0.7402 |
| 3% | 0.9132 | 0.9272 | 0.9201 | 0.7163 | 0.7293 | 0.7228 |
| 4% | 0.8837 | 0.8989 | 0.8912 | 0.6971 | 0.7106 | 0.7037 |
| 5% | 0.8504 | 0.8643 | 0.8573 | 0.6763 | 0.6893 | 0.6827 |

| | DSEBM-e | | | OC-SVM | | |
|---|---|---|---|---|---|---|
| Ratio c | Precision | Recall | $F_1$ | Precision | Recall | $F_1$ |
| 1% | 0.6995 | 0.7135 | 0.7065 | 0.7129 | 0.6785 | 0.6953 |
| 2% | 0.6780 | 0.6876 | 0.6827 | 0.6668 | 0.5207 | 0.5847 |
| 3% | 0.6213 | 0.6367 | 0.6289 | 0.6393 | 0.4470 | 0.5261 |
| 4% | 0.5704 | 0.5813 | 0.5758 | 0.5991 | 0.3719 | 0.4589 |
| 5% | 0.5345 | 0.5375 | 0.5360 | 0.1155 | 0.3369 | 0.1720 |

For illustrative purposes, an example is provided to demonstrate some advantages of DAGMM learned by end-to-end training, as compared with systems and methods that rely on conventional pre-trained deep autoencoders.

A low-dimensional representation can be learned by DAGMM, PAE, DAGMM-p, and DCN, from one of the experiment runs on the KDDCUP dataset. First, we note from experiments that the DAGMM system 900 can better separate anomalous samples from normal samples in the learned low-dimensional space, while anomalies overlap more with normal samples in the low-dimensional space learned by PAE, DAGMM-p, or DCN.

Second, even if DAGMM-p and DCN take effort to fine-tune the pre-trained deep autoencoder by its estimation network or k-means regularization, one could barely see significant change among the learning methods, where many anomalous samples are still mixed with normal samples. Indeed, when a deep autoencoder is pre-trained, it tends to be stuck in a good local optima for the purpose of reconstruction only, but it could be suboptimal for the subsequent density estimation tasks. In addition, in our study, we find that the reconstruction error in a trained DAGMM is as low as the error received from a pre-trained deep autoencoder (e.g., around 0.26 in terms of per-sample reconstruction error for KDDCUP).

Furthermore, we also observe that it is difficult to reduce the reconstruction error for a deep autoencoder of the identical structure by end-to-end training (e.g., around 1.13 in terms of per-sample reconstruction error for KDDCUP). In other words, the compression network and estimation network mutually boost each others' performance during end-to-end training in accordance with various embodiments of the present invention, and the regularization introduced by the estimation network helps the deep autoencoder escape from less attractive local optima for better compression, while the compression network feeds more meaningful low-dimensional representations to estimation network for robust density estimation in accordance with the present invention.

In accordance with various embodiments of the present invention, a DAGMM-based DEN can be constructed for unsupervised anomaly detection. DAGMM can include two major components, namely a compression network and estimation network, where the compression network can project samples into a low-dimensional space that preserves the key information for anomaly detection, and the estimation network can evaluate sample energy in the low-dimensional space under the framework of Gaussian Mixture Modeling. As described above, DAGMM is friendly to end-to-end training, such that the estimation network predicts sample mixture membership so that the parameters in GMM can be estimated without alternating procedures; and the regularization introduced by the estimation network helps the compression network escape from less attractive local optima and achieve low reconstruction error by end-to-end training in accordance with the present invention.

As compared with the pre-training systems and methods, the end-to-end training is more beneficial for density estimation tasks, as we can have more freedom to adjust dimensionality reduction processes to favor the subsequent density estimation tasks. In the experimental study, the DAGMM-based DEN system 900 demonstrates superior performance over conventional state-of-the-art techniques on public benchmark datasets with up to 14% improvement on the standard $F_1$ score, and shows a significant improvement over conventional systems and methods for unsupervised anomaly detection on multi-or high-dimensional data in accordance with various embodiments of the present invention.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for preventing cyberattacks using a Density Estimation Network (DEN) for unsupervised anomaly detection, comprising:
   constructing the DEN using acquired network traffic data by performing end-to-end training, the training comprising:
      generating, using a compression network, low-dimensional vector representations of the network traffic data by performing dimensionality reduction of the network traffic data;
      predicting mixture membership distribution parameters for each of the low-dimensional vector representations by performing density estimation using a Gaussian Mixture Model (GMM) framework, and formulating an objective function J to estimate an energy and determine a density level of the low-dimensional representations for anomaly detection, an anomaly being identified when the energy exceeds a pre-defined threshold, wherein the objective function J is determined as follows:

J=reconstruction_error+energy, where reconstruction error can represent any reconstruction error made by dimensionality reduction, and energy is also called negative likelihood, which is inversely proportional to the likelihood that one can observe given training data under the current parameterized Gaussian mixture model; and preventing cyberattacks by blocking transmission of network flows with identified anomalies by directly filtering out the flows using a network traffic monitor.

2. The method as recited in claim 1, wherein the low-dimensional vector representations are generated from reduced space and reconstruction error features.

3. The method as recited in claim 1, wherein the dimensionality reduction of the network traffic data is performed using a deep autoencoder.

4. The method as recited in claim 1, further comprising identifying the mixture means and mixture deviations using the predicted mixture membership distribution parameters.

5. The method as recited in claim 1, wherein the energy is determined as follows:

$$E(z) = -\log\left(\sum_{k=1}^{K} \hat{\phi}_k \frac{\exp\left(-\frac{1}{2}(z-\hat{\mu}_k)^T \hat{\Sigma}_k^{-1}(z-\hat{\mu}_k)\right)}{\sqrt{|2\pi\hat{\Sigma}_k|}}\right)$$

where z is the hidden representation of an input sample, Pk and 2k are the mean and covariance matrix in the k-th component of the GMM, 71 is approximately 3.14159, Pk is the probability that a sample belongs to the k-th component, and K is the number of components in the GMM.

6. The method as recited in claim 1, wherein the DEN is a multi-layer neural network.

7. The method as recited in claim 1, wherein the network traffic data is high-dimensional, contaminated data.

8. A system for preventing cyberattacks using a Density Estimation Network (DEN) for unsupervised anomaly detection, comprising:

a hardware processor operatively coupled to a computer readable storage medium, the hardware processor being configured for constructing, using a DEN constructor, the DEN based on acquired network traffic data by performing end-to-end training using a DEN trainer, the training comprising:

generating, using a compression network, low-dimensional vector representations of the network traffic data by performing dimensionality reduction of the network traffic data;

predicting, using a density estimator, mixture membership distribution parameters for each of the low-dimensional vector representations by performing density estimation using a Gaussian Mixture Model (GMM) framework; and formulating, using an objective function calculator, an objective function J to estimate an energy and determine a density level of the low-dimensional representations for anomaly detection, an anomaly being identified when the energy exceeds a pre-defined threshold, wherein the objective function J is determined as follows:

J=reconstruction error+energy, where reconstruction error can represent any reconstruction error made by dimensionality reduction, and energy is also called negative likelihood, which is inversely proportional to the likelihood that one can observe given training data under the current parameterized Gaussian mixture model; and a controller configured for preventing cyberattacks by blocking transmission of network flows with identified anomalies by directly filtering out the flows using a network traffic monitor.

9. The system as recited in claim 8, wherein the low-dimensional vector representations are generated from reduced space and reconstruction error features.

10. The system as recited in claim 8, wherein the dimensionality reduction of the network traffic data is performed using a deep autoencoder.

11. The system as recited in claim 8, further comprising identifying, using a parameter learner, the mixture means and mixture deviations using the predicted mixture membership distribution parameters.

12. The system as recited in claim 8, wherein the energy is determined as follows:

$$E(z) = -\log\left(\sum_{k=1}^{K} \hat{\phi}_k \frac{\exp\left(-\frac{1}{2}(z-\hat{\mu}_k)^T \hat{\Sigma}_k^{-1}(z-\hat{\mu}_k)\right)}{\sqrt{|2\pi\hat{\Sigma}_k|}}\right)$$

where z is the hidden representation of an input sample, Pk and 2k are the mean and covariance matrix in the k-th component of the GMM, 7r is approximately 3.14159, 1k is the probability that a sample belongs to the k-th component, and K is the number of components in the GMM.

13. The system as recited in claim 8, wherein the DEN is a multi-layer neural network.

14. The system as recited in claim 8, wherein the network traffic data is high-dimensional, contaminated data.

15. A non-transitory computer readable storage medium comprising a computer readable program for preventing cyberattacks using a Density Estimation Network (DEN) for unsupervised anomaly detection, wherein the computer readable program when executed on a computer causes the computer to perform the steps of:

constructing the DEN using acquired network traffic data by performing end-to-end training, the training comprising:

generating, using a compression network, low-dimensional vector representations of the network traffic data by performing dimensionality reduction of the network traffic data;

predicting mixture membership distribution parameters for each of the low-dimensional vector representations by performing density estimation using a Gaussian Mixture Model (GMM) framework; and formulating an objective function J to estimate an energy and determine a density level of the low-dimensional representations for anomaly detection, an anomaly being identified when the energy exceeds a pre-defined threshold, wherein the objective function J is determined as follows:

$$J = \text{reconstruction error} + \text{energy}$$

where reconstruction error can represent any reconstruction error made by dimensionality reduction, and energy is also called negative likelihood, which is inversely proportional to the likelihood that one can observe given training data under the current parameterized Gaussian mixture model; and preventing the cyberattacks by blocking transmission of network flows with identified anomalies by directly filtering out the flows using a network traffic monitor.

16. The computer readable storage medium as recited in claim 15, wherein the low-dimensional vector representations are generated from reduced space and reconstruction error features.

17. The computer readable storage medium as recited in claim 15, wherein the dimensionality reduction of the network traffic data is performed using a deep autoencoder.

18. The computer readable storage medium as recited in claim 15, wherein the energy is determined as follows:

$$E(z) = -\log\left(\sum_{k=1}^{K} \hat{\phi}_k \frac{\exp\left(-\frac{1}{2}(z - \hat{\mu}_k)^T \hat{\Sigma}_k^{-1} (z - \hat{\mu}_k)\right)}{\sqrt{|2\pi\hat{\Sigma}_k|}}\right)$$

where z is the hidden representation of an input sample, k and 2k are the mean and covariance matrix in the k-th component of the GMM, 71 is approximately 3.14159, k is the probability that a sample belongs to the k-th component, and K is the number of components in the GMM.

* * * * *